(12) United States Patent
Ben-Yaakov

(10) Patent No.: US 6,469,917 B1
(45) Date of Patent: Oct. 22, 2002

(54) PFC APPARATUS FOR A CONVERTER OPERATING IN THE BORDERLINE CONDUCTION MODE

(75) Inventor: Shmuel Ben-Yaakov, Beer-Sheva (IL)

(73) Assignee: Green Power Technologies Ltd., Park Tamar Rehovot (IL)

( * ) Notice: Subject to any disclaimer, the term of this patent is extended or adjusted under 35 U.S.C. 154(b) by 0 days.

(21) Appl. No.: 09/931,691

(22) Filed: Aug. 16, 2001

(51) Int. Cl.[7] ............................. H02M 1/14; G05F 1/70
(52) U.S. Cl. ......................... 363/44; 363/89; 323/222
(58) Field of Search ........................... 323/222; 363/44, 363/45, 46, 47, 84, 89, 124, 126

(56) References Cited

U.S. PATENT DOCUMENTS

| | | | |
|---|---|---|---|
| 5,047,912 A | | 9/1991 | Pelly |
| 5,430,364 A | * | 7/1995 | Gibson ........................ 323/207 |
| 5,687,070 A | * | 11/1997 | Jacobs et al. ................ 363/126 |
| 5,726,872 A | * | 3/1998 | Vinciarelli et al. ........... 363/89 |
| 5,742,151 A | | 4/1998 | Hwang |
| 5,991,172 A | | 11/1999 | Jovanovic et al. |
| 6,034,513 A | | 3/2000 | Farrington et al. |
| 6,043,633 A | | 3/2000 | Lev et al. |
| 6,178,104 B1 | * | 1/2001 | Choi ........................... 363/89 |
| 6,259,614 B1 | | 11/2001 | Ribarich et al. |
| 6,373,734 B1 | * | 4/2002 | Martinelli .................... 363/89 |
| 6,388,429 B1 | * | 5/2002 | Mao ............................ 323/222 |

FOREIGN PATENT DOCUMENTS

EP         1049239         11/2000

* cited by examiner

Primary Examiner—Adolf Denske Berhane
(74) Attorney, Agent, or Firm—Cooper & Dunham LLP

(57) ABSTRACT

Power factor correction apparatus, for a switching power supply fed by an array of rectifying diodes and consisting of at least an input inductor, a contact of which is connected in series with a contact of the array, and of a power switch connected between the other contact of the array and the other contact of the input inductor that comprises circuitry for identifying, in each cycle determined by the switching frequency of the power supply, whenever the instantaneous value of the current through the inductor reaches a minimal value; circuitry for switching the power switch to its conducting state in response to the minimal current through the inductor; circuitry for reflecting the current flowing through the inductor by a measurable or simulated parameter; and circuitry for providing indication, in each cycle, by using the parameter, the indication being related to the timing until the peak value of the current, that corresponds to a specific load, has been essentially reached, or to the time from the moment that the current reaches the minimal value until the timing, and for switching the power switch to its non-conducting state in response to the indication.

30 Claims, 22 Drawing Sheets

PFC APPARATUS FOR A CONVERTER OPERATING IN THE BORDERLINE CONDUCTION MODE

FIELD OF THE INVENTION

The present invention relates to the field of switching power converters. More particularly, the present invention relates to a method and apparatus for regulating the harmonics content of the current drawn from the power line boy electrical equipment and loads by utilizing Borderline Conduction Mode (BCD) of operation without sampling the input voltage. The present invention also relates to the electronic circuit design, physical construction and layout of such an apparatus.

BACKGROUND OF THE INVENTION

Currently, there are several types of converters, which are widely used for DC-to-DC, DC-to-AC, AC-to-DC and AC-to-AC power conversion. In some applications, the purpose of the power conversion schemes is to shape the input current seen at the input of the converter, in order to correct the power factor. For example, in a power converter known in the art as an Active Power Factor Correction (APFC) converter, the role of the converter is to ensure that the AC current drawn from the power line is in phase with the line voltage, with minimal level of high-order harmonics. A typical and well-known implementation of an APFC converter is illustrated in FIG. 1. According to this implementation, the input voltage is rectified by diode bridge $D_1$ and fed into a Boost converter that comprises an input inductor $L_{in}$, a switch $S_1$, a high frequency rectifier ($D_2$), an output filter capacitor ($C_O$) and a load ($R_L$). A power switch ($S_1$) is driven by a high frequency control signal of duty cycle $D_{ON}$, so as to force the input current ($i_{ina}$) to follow the shape of the rectified input voltage ($V_{i,R}$), in which case the power converter becomes essentially a resistive load to the power line; i.e., the Power Factor (PF) will be a unity.

The need for APFC converters is driven by the worldwide concern for the quality of the power line supplies. Injection of high harmonics into the power line and poor Power Factor (PF) in general, is known to cause many problems. Among these problems are the lower efficiency of power transmission, possible interference to other units connected to the power line, and distortion of the line voltage shape. In the light of the practical importance of APFC converters, many countries have adopted, or are in the process of adopting, voluntary and mandatory standards. These standards set limits to the permissible current line harmonics injected by any given equipment that is powered by an alternating current (AC) electrical power source, so as to maintain a high power-quality. Another advantage of an APFC converter is the increase in the power level than can be drawn from a given power line. Without Power Factor Correction, the effective (i.e., rms) current will be higher than the magnitude of the first harmonics of the current, the latter being the only component that contributes real power to the load. Additionally, protection elements such as fuses and circuit breakers respond to the rms current. Consequently, the rms current limits the maximum power that can be drawn from the line. In Power Factor Correction equipment, the rms current equals the magnitude of the first harmonic of the current (since the higher harmonics are absent) and hence, the power drawn from the line essentially reaches its maximum theoretical value. It is thus evident that the need for APFC circuits is widespread and that economical realization of such circuits is of prime importance. Cost is of great concern, considering the fact that the APFC is an add-on expense to the functionality of the original equipment in which the APFC converter is included. In the light of the above, physical construction methods of APFC that are economical to produce, and can be easily integrated in any given equipment, are highly desirable and advantageous.

Common APFC converters usually operate in one of three modes (with respect to the current passing through the main inductor Lin):

(1) Continuous Conduction Mode (CCM), in which the inductor current never drops to zero;

(2) Discontinuous Conduction Mode (DCM), in which the inductor current drops to zero for a portion of every switching cycle; and (3) Borderline Conduction Mode (BCM), in which the inductor current rises immediately after it drops to zero.

The shape of the inductor current in CCM is depicted in FIG. 2, that of DCM in FIG. 3 and the shape of the inductor current in BCM is depicted in FIG. 4. In these figures, $T_{ON}$ is the time during which the power switch $S_1$ (FIG. 1) is on, $T_{OFF}$ is the time during which the inductor (current) is in the discharge phase, $T_S$ is the switching period $$\left(T_S = \frac{1}{f_S}, f_S = \text{switching frequency}\right),$$

$I_{L_{in}}$ is the inductor current, and $I_{pk}$ is the peak inductor current.

The most efficient mode of operation is CCM, since the rms current of the power switch $S_1$ is the lowest. However, reverse recovery of the main diode $D_2$ poses extra losses and EMI generation. Furthermore, implementing an APFC converter in CCM mode requires that $L_{in}$ is of high inductance value, making it bulky and costly. The DCM is the least desirable since the inductor rms current is the highest, which increases the power switch losses and makes the main inductor large in size, because the physical size of an inductor is proportional to the rms current that is expected to pass through it. A good compromise is, therefore, the BCM mode of operation. Implementing the BCM mode allows reduction of the inductor size, as well as the power switch losses. Furthermore, in a properly designed BCM converter, the voltage across the power switch will, by itself, drop to zero just after the inductor current reverses its direction due to the reverse current of the main diode. Turning the main power switch under zero voltage switching (ZVS) conditions reduces switching losses and hence increases the efficiency of the converter.

FIG. 5 represents a conventional realization of a BCM converter according to the prior art. The controller CONT receives the shape of the rectified power line voltage ($V_{ac\_ref}$) obtained via the voltage divider $R_a$, $R_b$ from $V_{i,R}$, which is used as the reference for the desired shape of the input current. The controller receives the voltage $V_{se}$ across $R_{se}$, which is identical to the input current when the power switch $Q_1$ is conducting, and generates gate pulses $D_{ON}$ to the power switch $Q_1$, so as to force the inductor current to follow the reference voltage shape. The current level is adjusted for any given load $R_L$ by monitoring the output voltage $V_{od}$ via the voltage divider $R_1$, $R_2$, and multiplying the reference signal $V_{ac\_ref}$ by the deviation from the desired output voltage level, so as to adjust the effective reference signal to the load. BCM operation is achieved by turning on the power switch $Q_1$ (i.e. $Q_1$ conducts) only after the inductor current reaches a zero level. One way to detect this instance is by an auxiliary winding $L_2$ that is coupled to the main inductor $L_{in}$. The auxiliary winding $L_2$ produces a positive voltage $V_{tr}$ whenever the inductor current reaches zero. The same $L_2$ winding can also be used, together with $D_3$, $R_{tr}$ and $C_b$, to generate the auxiliary power supply $+V_{CC}$ required for the controller.

A major drawback of the prior art BCM converter is the need to sense the converter s input voltage, namely the line voltage after rectification. Due to the switching effects, the input voltage $V_{ivR}$ is normally noisy and is susceptible to interference that may distort the reference signal and hence the controlled input current. Furthermore, the extra contact required for sensing the input current increases the number of pins of a modular device, if built according to conventional BCM schemes.

U.S. Pat. No. 5,742,151 discloses a PFC converter that provides unity PF by sensing only a current in the PFC circuit and a DC supply voltage. In the disclosed technique, the feature of sensing the input voltage is not used. However, conventional methods that do not sample the input voltage cannot operate in the BCM, but only in CCM and, with some inferior performance, in DCM. The reason for this is the fundamental difference between CCM, DCM and BCM. In CCM and DCM converters: the switching frequency is constant, whereas in BCM, the switching frequency has to adaptively change over the line voltage cycle. The reason for the need to change the switching frequency in BCM is that at the end of each $T_{OFF}$ the inductor current must reach zero. The period of each switching cycle is thus determined by the state of the converter (e.g., inductance of $L_{in}$ and the average input current at any given cycle) and cannot be dictated by an independent oscillator. Consequently, APFC control schemnes that apply constant switching frequency cannot operate as BCM APFC controllers.

U.S. Pat. No. 6,034,513 also discloses a PFC controller that provides unity PF by sensing only a current in the PFC circuit and a DC supply voltage. However, this disclosure suffers from the same drawback as U.S. Pat. No. 5,742,151.

U.S. Pat. No. 5,047,912 discloses a modular four terminal solution to the realization of APFC converters. The control scheme applies a signal differentiator to generate a reference signal to the feedback loop. As it is known in the art, differentiators are extremely sensitive to noise that may corrupt the output signal. This is of particular concern in the environment of a switching circuit such as a Pulse Width Modulation (PWM) Boost converter, which is characterized by high frequency noise injection. Another drawback of the solution of said patent is that the reference feedback signal is derived from the line voltage. Since this signal normally includes noise, the derived reference signal may be highly corrupted by signals that distort the shape of the desired controlled line current.

According to conventional techniques, APFC converters can be built in either of the following ways:

1. As a subcircuit that is implemented as part of target equipment. In this case, the designer of the equipment applies passive and active components, as well as Integrated Circuit (IC) units to realize the front-end APFC converter. In FIG. 6, for example, a typical prior art subcircuit is included: the input rectifier $D_1$, inductor $L_{in}$, power switch (such as a power MOSFET) $Q_1$, a high frequency main diode $D_2$, an output capacitor $C_O$, an IC APF Controller with some auxiliary passive components, current sensing resistor $R_S$ and an output voltage divider $R_1$ and $R_2$. This physical embodiment has many disadvantages. High cost and low reliability are normally associated with a design that includes a large component count. Furthermore, as known in the art, the rather massive wiring required to realize the APFC converter makes it highly susceptible to Electro Magnetic Interference (EMI) and 'ground' noises. Consequently, this embodiment is highly undesirable, as it has many economic and engineering drawbacks;

2. Another possible embodiment of the APFC converter is to implement it as one block that includes all major components. In this case (see FIG. 7) the complete APFC converter is packaged as a single unit that includes all the required circuitry. This embodiment has the advantage of providing a solution to the problem mentioned in relation to FIG. 6. However, a problem of heat removal arises in this case. Additionally, being a separate unit that is normally obtained from a third party, the cost of such a solution is normally high. This is of special importance considering the fact that the APFC converter is an add-on to the equipment—it is not required for its basic operation, but only to comply with line interface standards. Another disadvantage of this approach is the fact that it is compatible with IC technology and hence cannot benefit from the relatively low production cost of microelectronics. A further drawback of the one-block construction is the fact that all heat dissipating components, such as the main switch, diodes and inductor, are in close proximity to each other and hence the problem of heat removal could limit the ability of such a module to handle high power levels. Also, close proximity components that generate considerable EMI necessitates the inclusion of heavy shielding and filtering that increase complexity and cost and lower the efficiency.

There is thus a widely recognized need for APFC controllers that operate in DCM mode, but which do not require sensing the input voltage. It would be further highly desirable that the same circuit be able to operate both in BCM mode and, by employing slight hardware or software changes, in CCM mode. Moreover, it would be highly advantageous to have APFC controllers of modular construction that are also compatible with current microelectronics technologies.

All of the methods described above have not yet provided solutions to the problem of utilizing BCM-based APFC circuits without sampling the AC line voltage or the voltage at the APFC converter input.

It is an object of the present invention to provide a method for improving the Power Factor (PF) of an AC-to-DC power converter that utilizes a BCM-based Active Power Factor Correction (APFC) controller.

It is another object of the present invention to provide a method for regulating the harmonic content of the current drawn from the power line by electrical equipment without sampling the voltage of the power line or the voltage at the APFC converter input.

It is still another object of the present invention to provide an apparatus, of which efficient electronic design, physical construction and layout are meticulously adapted.

It is still further another object of the present invention to provide a method and apparatus for allowing changing a BCM-based APFC controller to CCM-based APFC controller by utilizing essentially the same circuit components.

Other objects and advantages of the invention will become apparent as the description proceeds.

SUMMARY OF THE INVENTION

The present invention is directed to a power factor correction apparatus, for a switching power supply fed by an arrays of rectifying diodes and consisting of at least an input inductor, a contact of which is connected in series with a contact of the array, and of a power switch connected between the other contact of the array and the other contact of the input inductor, that comprises:

a) circuitry for identifying, in each cycle determined by the switching frequency of the power supply, whenever the instantaneous value of the current through the inductor reaches a minimal value;

b) circuitry for switching the power switch to its conducting state in response to the minimal current through the inductor;

c) circuitry for reflecting the current flowing through the inductor by a measurable or simulated parameter; and d) circuitry for providing indication, in each cycle, by using the parameter, the indication being related to the timing until the peak value of the current, that corresponds to a specific load, has been essentially reached, or to the time from the moment that the current reaches the minimal value until the timing, and for switching the power switch to its non-conducting state in response to the indication.

Preferably, the apparatus further comprises:

a) circuitry for sampling the output voltage;

b) circuitry for generating a signal which reflects the deviation of the output voltage from a predetermined voltage value; and c) circuitry for modifying the value of one or more of the parameters in response to the signal, and for adjusting the timing at which the power switch is switched to its non-conducting state, thereby allowing the inductor current to reach a different peak value, for compensating the deviation, while keeping the portion, in each cycle, of the time period during which the power switch is in its non-conducting state.

The minimal value may be essentially zero, especially when the apparatus operates near border-line mode. The deviation in the output voltage may result from changes in the load or in the power line voltage.

Preferably, the circuitry for reflecting the current flowing through the inductor comprises:

a) a capacitor that is charged/discharged by a combination of a constant current source being inactive during the time periods when the power switch is in its conducting state and a dependent current source for discharging the capacitor with a current that is proportional to the input inductor current, such that the voltage over the capacitor inversely reflects the value of/changes in, the current flowing through the input inductor;

b) a first comparator, connected to the capacitor, for switching the power switch to its non-conducting state and for activating the constant current source whenever the voltage across the capacitor reaches a predetermined reference voltage; and c) a second comparator that samples the current flowing through the input inductor, for switching the power switch to its conducting state and for disactivating the constant current source whenever the current flowing through the input inductor reaches an essentially zero value.

In one aspect, the apparatus may comprise:

a) a timing circuitry for continuously sampling the output voltage of the converter and the input current passing through the converter, and for generating a cyclic intermediate signal, having in each cycle a portion of positive slope and a portion of negative slope, the positive slope having a duration being equal to the time required for the input current to decline from its maximum value, during the cycle, to a zero value, and the negative slope having a duration being equal to the time it takes the intermediate signal to decline from its maximum value to a reference value;

b) a first controllable current source, for adjusting the rising rate of the positive slope portion of the intermediate signal;

c) a second controllable current source, coupled to the timing circuitry, for adjusting the rate of decline of the negative portion of the intermediate signal and the rising rate of the positive slope portion of the intermediate signal, the second controllable current source having a magnitude that is smaller than the magnitude of the first controllable current source;

d) a first controllable switch, coupled to the output of the controlled converter, for controlling the input current of the converter;

e) a second controllable switch for connecting or disconnecting the first current source, for causing the rise and decline portions of the intermediate signal; and f) a drive circuit, coupled to the timing circuitry, for generating a switching signal from the intermediate signal for switching a first controllable switch for controlling the input current of the converter.

Preferably, the timing circuitry comprises:

a) a first means for comparing a voltage being a representative of the output voltage of the converter with a voltage reference;

b) a second means for sensing whenever the input current reaches a zero value; and c) means for multiplying the output of the first means by a voltage being a representative of the input current, for adjusting the second controllable current source.

The driving circuit may comprise a flip-flop, coupled to the timing circuit, that generates switching signal from the intermediate signal, for switching the first controllable switch. The first controllable current source may be controlled by a voltage being a representative of the output voltage of the converter that is controlled. The second controllable current source may be controlled by a voltage being a representative of the output voltage of the converter being controlled. The timing circuitry may comprise a capacitor, coupled to the second switch, to the second controllable current source and to one input of an amplifier, the capacitor being charged whenever the second switch is closed and discharged whenever the second switch is open, the voltage of the capacitor being the intermediate signal and compared to a reference voltage coupled to a second input of the amplifier of which output is coupled to the flip-flop.

In accordance with another aspect, the timing circuitry may comprise:

a) an 'Absolute-value' module (ABS), the input of which is coupled to the first and second current sources whenever the second switch is closed, and to the second current source whenever the second switch is open;

b) a Voltage-Controlled-Oscillator (VCO) module, coupled to the output of the ABS module, having an output clock signal of which frequency being dependent on the value of the magnitude of the current being delivered from the output of the ABS module to the input of the VCO module; and c) an 'up-down' counter, coupled to the VCO module and to the flip-flop, the counter counts 'up' whenever the second switch is closed and 'down' whenever the second switch is open, the 'up' and 'down' counting rates are a function of the VCO frequency being a representative of the absolute value of the magnitude of the current passing through the input of the ABS module.

The timing circuitry may further comprise a first oscillator having a constant frequency, for allowing to initialize/excite the operation of the converter and/or to resume normal operation, the first oscillator being inoperative in normal operation of the converter and a second oscillator having a constant frequency, for allowing to operate the converter at constant frequency, the frequency being adjusted so as to maintain the input current of the converter above zero.

The first oscillator and the second oscillator may be the same oscillator, that further comprises means for programming and/or for configuring and/or for switching the oscillator. The first current source adjusts a rate of decline of the intermediate signal and the second current source adjusts a rate of rise of the intermediate signal, the second controllable current source being greater in magnitude in comparison with the first controllable current source. The zero value input current of the converter may be sensed by means of an analog comparator, by digital means or by a second inductor, being inductively coupled to the first inductor, the first inductor induces voltage on the second inductor.

Preferably, the control circuit comprises:
a) a first means for digitizing the output voltage of the converter;
b) a second means for digitizing the input current of the converter; and
c) means for processing the data gathered from the first and second digitizing means, for generating the switching signal for the first controllable switch.

The control circuit components may be contained in a module that comprises five external contacts or in an integrated circuit (IC). The input current sensing resistor and/or the output diode and/or the power switch may be contained in, or being external to, a module that comprises five external contacts and/or to an integrated circuit (IC).

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
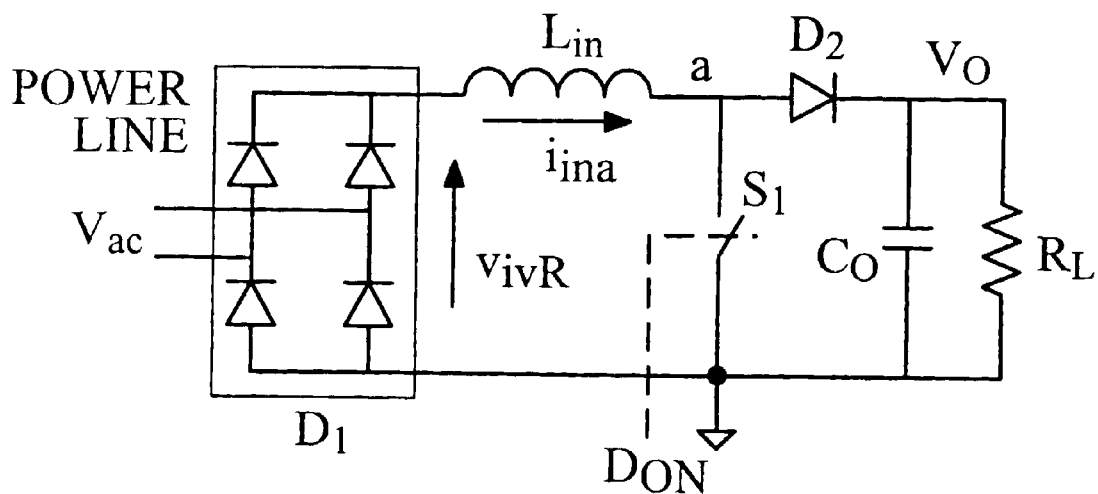
FIG. 1 illustrates a PWM Boost converter (prior art)

In one aspect, the present invention relates to a method for realizing an APFC converter that forces the system to remain in the Borderline Conduction Mode (BCM) without sampling the voltage at the input of the converter. With a small adaptation, the novel control methods can also be utilized for APFC operating in CCM mode.

Two current sources are utilized for charging a capacitor for a first duration being equal to "$T_{OFF}$", and for discharging the same capacitor for a second duration being equal to "$T_{ON}$". The capacitor may be either in a state of 'charging' or in a state of 'discharging'. For current sources having constant magnitudes, "$T_{OFF}$" depends only on the time it takes the inductor current to reach zero. On the other hand, the longer the duration "$T_{OFF}$" is, the higher the voltage level of the capacitor, resulting in longer "$T_{ON}$", since it takes the capacitor more time to discharge. Consequently, different loads have different "$T_{ON}$" and "$T_{OFF}$" (i.e., frequency and duty cycle). The effect of changing "$T_{ON}$" and "$T_{OFF}$" is further enhanced by adding (to the inductance current effect) the effect of changing at least the magnitude of one of the current sources according to a feedback voltage representing the output voltage (i.e., the voltage on the load) and according to a feedback voltage representing the input current.

According to one embodiment of the invention, forcing the converter to remain in the BCM mode is achieved by allowing the inductor current to reach zero, and by forcing the inductor current to increase immediately after it reaches zero. A comparator senses the inductor zero current and forces the output of a 'flip-flop' to be in its 'High' state. Immediately after, a power switch, coupled to said flip-flop, is closed to allow the Inductor current to increase, thereby allowing energy to accumulate in the Inductor.

The controller includes: (1) a timing circuit that continuously samples/senses the output voltage of the converter being controlled, and also the input current passing through the converter. The timing circuit generates a cyclic intermediate signal, which has in each cycle a portion of positive slope and a portion of negative slope. The rate of the positive slope depends on the magnitudes and flow direction of two controllable current sources, and the duration of the positive slope portion equals to the time it takes the converter's input current to decline from its maximum value (i.e. in a specific cycle), to a zero value. The negative slope duration equals to the time it takes the intermediate signal to decline from its maximum value to a reference value, and the rate of the negative slope depends on one controllable current source, (2) A first controllable current source (i.e. $I_1$), which is coupled to the timing circuit whenever a positive slope portion of the intermediate signal should be generated, and it is also utilized for adjusting the rate of rise of the positive slope portion of the intermediate signal, (3) A second controllable current source (i.e. $I_2$), the magnitude of which is smaller than the first current $I_1$, is constantly coupled to the timing such a way that its current and the current of the first current source flow in opposite directions into the timing circuit whenever the positive slope portion of the intermediate signal should be generated. In this way, the second current source $I_2$ also affects the adjustment of the rate of rise of the negative portion of the intermediate signal. Additionally, the negative slope rate is determined only by the second current source $I_2$, (4) a first controllable switch, which is coupled to the output of the controlled converter, for controlling the input current of said converter, (5) a second controllable switch for intermittently connecting and disconnecting the first current source $I_1$, for causing the intermediate signal to rise and decline, and (6) a drive circuit, which is coupled to the timing circuitry. The drive circuit generates a switching signal from the intermediate signal for switching the first controllable switch, thereby controlling the input current of the converter.

According to one embodiment of the invention, the timing function performed by the timing circuit is implemented by a capacitor being charged and discharged in accordance with the current passing through it; namely a positive current (i.e., $I_1$ and $I_2$) whenever a positive slope portion of the intermediate signal is to be generated, and a negative current ($-I_2$) whenever a negative slope portion of the intermediate signal is to be generated. Therefore, the voltage of the capacitor forms the intermediate signal, from which a switching signal is generated by a flip-flop, for driving the first switch.

According to another embodiment of the invention, the timing function performed by the timing circuit is implemented by a digital counter. This implementation utilizes two current sources in exactly the same way as described regarding the capacitor, except that in this implementation the 'charging' phase is replaced by "counting-up" by the counter, and the 'discharging' phase is replaced by a "counting-down" counter. The reference voltage, to which the capacitor's voltage declines in each cycle of the intermediate signal, is replaced by the counter having the value N=0.

The control circuit comprises Analog-to-Digital (A/D) modules to digitize samplings of the output voltage and input current of the converter, and a microprocessor that manipulates the digitized values for generating switching signals for the first switch.

A novel feature of the invention disclosed herein is that an APFC converter operates in BDM mode without sampling the input voltage of the converter. This makes the converter less sensitive to noise and facilitates a modular construction of the electronics in either monolithic (i.e., an electronic microchip), hybrid or discrete implementation. These features reduce the cost of APFC converters built in accordance with this invention and improve their performance.

Another feature of the present invention is the application of control methods that reduce the number of interconnections and wiring, and combining the switch and associated control circuitry into one module. This allows the construction of a complete APFC converter from five basic and independent elements: the input rectifier, inductor, switch module, output diode and output capacitor. Alternatively, by including the diode within the main switch assembly, the number of components for a complete system is reduced to four. Since the number of interconnections is minimal the power flow is simple, resulting in minimum interference to other parts of the equipment. At the same time, the streamlined construction minimizes the susceptibility of the circuit to switching noises and hence improve the stability and reliability of the circuit. This construction is compatible with microelectronics technology. In particular, the switch and control module, with or without the output diode, can be produced by conventional Silicon based IC technology, making this sub-assembly a relatively low cost component. The invention also provides a cost-effective solution to the problem of efficiently generating a local supply voltage needed to power the internal circuitry of the switch module. This is of particular importance in high power level applications in which the local power supply needs to sustain relatively high currents. The present invention provides a method for optimizing the design of APFC converters in the sense that the APFC can be assembled from basic building blocks that are easy to mount, have high reliability, potentially lower cost and are highly compatible with common heat removal methods, such as heat sinks and fan cooling.

The control strategy and constructional method according to this invention thereby overcome the drawbacks of existing design and control methods, which include many interconnected components, signal differentiating or a costly single module with poor heat management capabilities. An important new feature of the invention is the ability to operate the system in either BCM or CCM.

The construction and operation of the APFC built according to the present invention may be better understood with reference to the drawings and accompanying description.

Principles of APFC Converter

Figure 2:
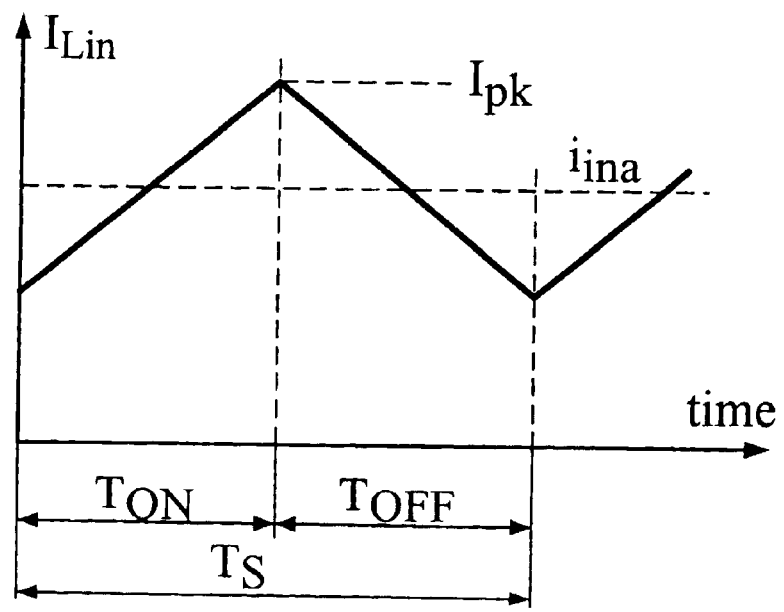
FIG. 2 illustrates exemplary Inductor current in Continuous Conduction Mode (CCM) for the converter illustrated in FIG. 1.
Figure 3:
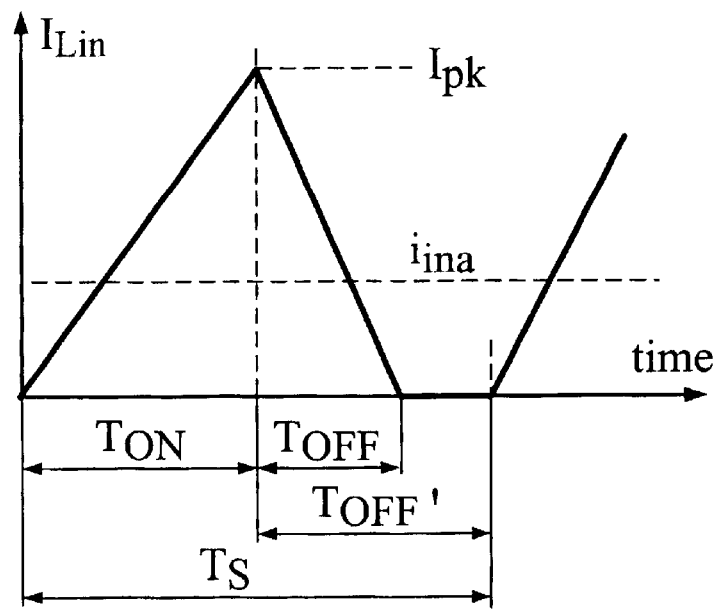
FIG. 3 illustrates exemplary Inductor current in Discontinuous Conduction Mode (DCM) for the converter illustrated in FIG. 1.

Referring again to FIG. 1, the prior art APFC is realized using a Boost ?It converter and associated circuitry. Some of the components (such as $L_{in}$ and $C_O$) are of relatively large size and are not compatible with microelectronics technology. Other elements, such as the power switch ($S_1$), the controller and the rectifier diode ($D_2$), are made of Silicon and can be produced on a single IC chip. However, the embodiment of FIG. 2 includes many individual components and back and forth interconnection that precludes the streamlining of the APFC converter. For example, for proper operation, the rectified input voltage $V_{ivR}$ should be sensed and hence, a wire has to be connected between the feed point and the controller. Also, in order to regulate the output voltage, a sense line should be connected between the output port (i.e. $V_O$) and the controller (normally after voltage division by $R_1$ and $R_2$).

Figure 8:
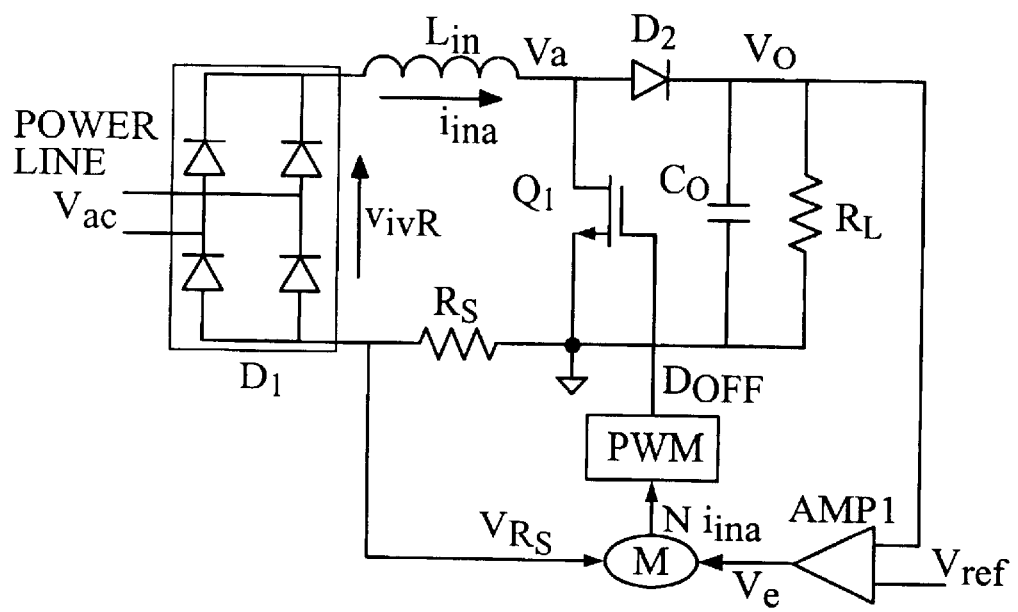
FIG. 8 illustrates an APFC controller with no sensing of input voltage (prior art)

An improvement in construction of APFC converters can be obtained by applying a modified control strategy that does not require sensing the input voltage. Such an arrangement is depicted in FIG. 8. The operation of this control scheme is as follows: In FIG. 8, voltage ($V_a$) is a pulsating voltage having maximum amplitude $V_O$ and duration of $T_{OFF}$ when $Q_1$ is not conducting. Consequently, the average voltage at point 'a' ($V_a$) will be:

$$v_a = \frac{V_o T_{OFF}}{T_S} \quad (1)$$

where $T_S$ is the PWM switching period.
Or:

$$v_a = V_o D_{OFF} \quad (2)$$

where $$D_{OFF} = \frac{T_{OFF}}{T_S} \quad (3)$$

The 'on' duty cycle $D_{ON}$, when $Q_1$ is conducting (During "$T_{ON}$"), is similarly defined as:

$$D_{ON} = \frac{T_{ON}}{T_S} \quad (4)$$

The input voltage fed into the Boost converter ($V_{ivR}$), is assumed to be of low frequency as compared to the switching frequency $$\left( f_S = \frac{1}{T_S} \right)$$

and hence, can be considered to be constant during one or several switching periods ($T_S$) Assuming that the power converter is properly controlled, the average low frequency voltage across $L_{in}$ is close to zero (otherwise the current will increase to very high values). This implies that:

$$v_{ivR} = v_a \quad (5)$$

where $V_{ivR}$ is the instantaneous low frequency component of $V_{ivR}$. Or from (1)

$$v_{ivR} = V_o D_{OFF} \quad (6)$$

If $D_{OFF}$ is programmed according to the rule:

$$D_{OFF} = N i_{ina} \quad (7)$$

where N is a constant and $i_{ina}$ is the low frequency component of the input current ($i_{ina}$), then:

$$v_{ivR} = V_o N i_{ina} \quad (8)$$

or:

$$i_{ina} = \frac{v_{ivR}}{V_o N} \quad (9)$$

Assuming that $C_O$ is sufficiently large so that the ripple of $V_O$ can be neglected, one sees that according to (8) the input current will follow the input voltage. That is, the converter will look resistive with an apparent input resistance (Re):

$$R_e = N V_o \quad (10)$$

Which implies that N controls the input resistance Re:

$$N = \frac{R_e}{V_o} \quad (11)$$

The value of the input resistance and hence the input current can thus be controlled by varying N. In practical applications, $V_O$ should be maintained constant even if the load ($R_L$) varies. In this control scheme, the output voltage can be maintained constant by closing a feedback loop on the value of N.

FIG. 8 schematically illustrates changing the duty cycle of PWM signal that is delivered to the power switch $Q_1$. Here the voltage that is proportional to the input current ($V_{R_S}$), as sensed by the resistor $R_S$, is multiplied (M) by the output of an error amplifier ($V_e$). The output signal of the amplifier is proportional to the deviation of the output voltage $V_O$ from a reference voltage $V_{ref}$. The product, which is proportional to $i_{ina}$ by a given factor N is fed to a PWM modulator that controls the value of $D_{OFF}$ according to (7). It should be pointed out that the PWM modulator is driven by an oscillator having a constant frequency (not shown). Consequently, this conventional method cannot be utilized for operation in BCM mode.

Figure 4:
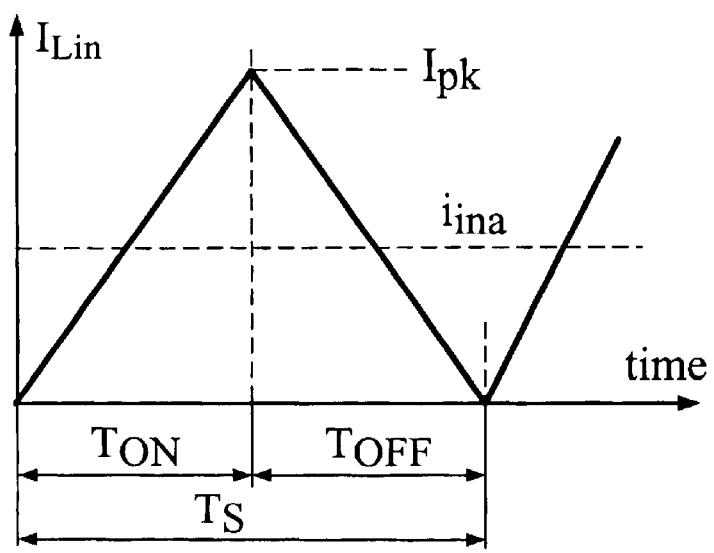
FIG. 4 illustrates exemplary Inductor current in Borderline Conduction Mode (BCM) for the converter illustrated in FIG. 1.
Figure 5:
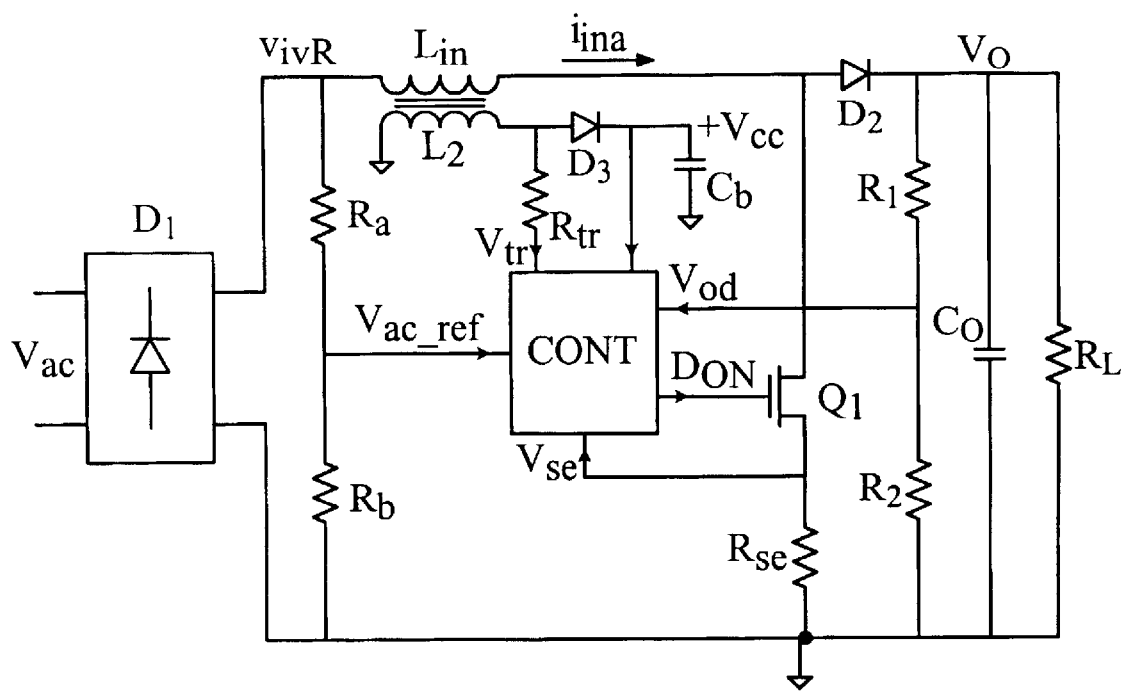
FIG. 5 illustrates a BCM APFC converter (prior art)
Figure 6:
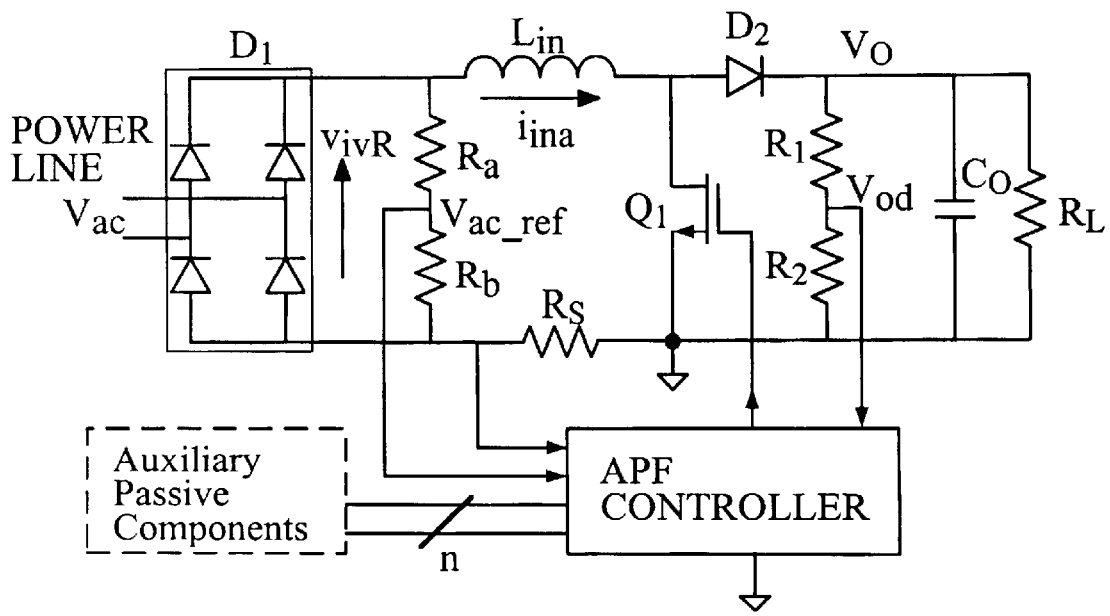
FIG. 6 illustrates a typical construction of an APFC converter (prior art)
Figure 7:
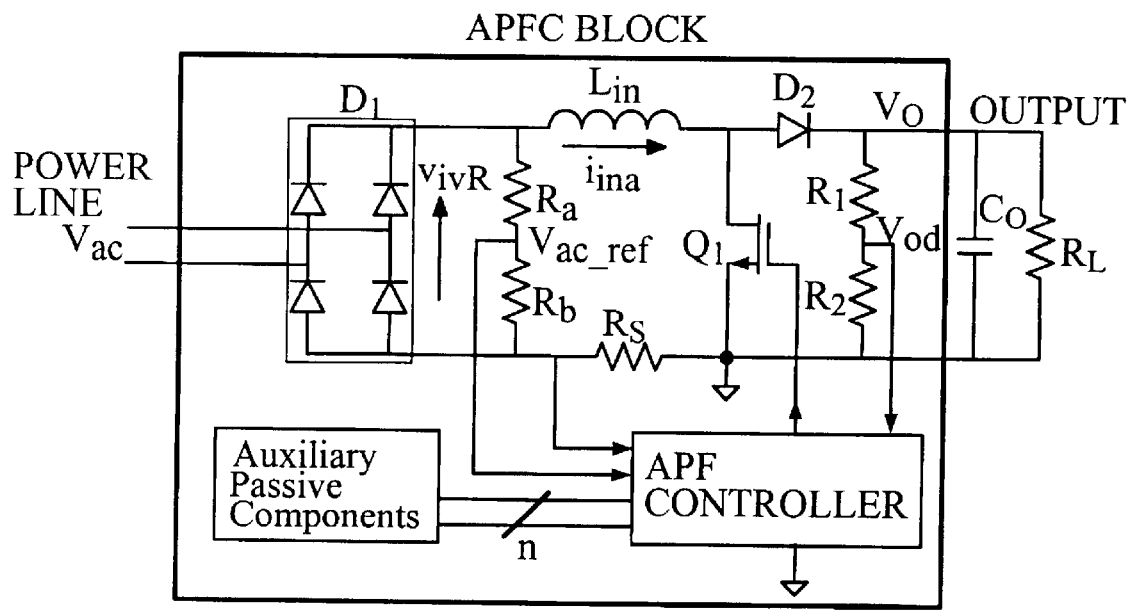
FIG. 7 illustrates one block embodiment of a APFC controller (prior art)

In the borderline case, the duration $T_{OFF}$ (FIG. 4) is the time it takes the inductor current to drop to zero. Therefore, this period cannot be controlled or modified by the control circuit. However, $D_{OFF}$ as defined by (3) can still be programmed according to Eq. (7) by adjusting $D_{ON}$.

Figure 9:
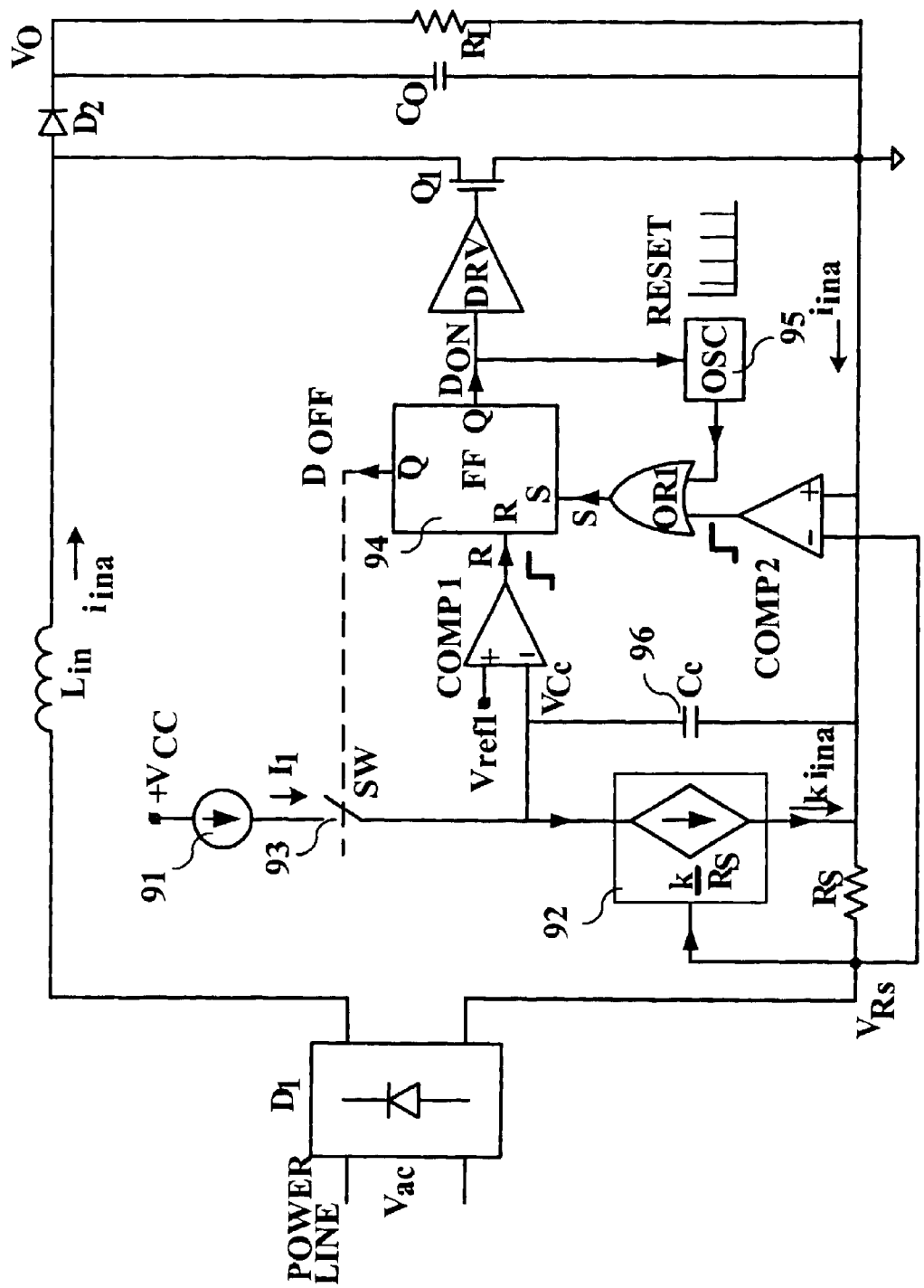
FIG. 9 illustrates a general layout and functioning of the BCM APFC controller, according to a preferred embodiment of the invention.

FIG. 9 schematically illustrates the general functioning and layout of one embodiment of the present invention. A simplified solution to implement Eq. (7) in BCM mode is described. The solution includes two current sources that feed a capacitor $C_C$ (96): an independent current source 91 that produces the current $I_1$ and a dependent current source 92 that produces a current that is proportional to $i_{ina}$ (i.e. $k*i_{ina}$). The dependent current source 92 is controlled by the voltage across the sense resistor $R_S$ through which $i_{ina}$ is passing. The current source 91 is connected to the capacitor via a switch SW (93) that is conducting during the period $T_{OFF}$ The signal Doff for the duration $T_{OFF}$, as well as the complementary signal $D_{ON}$, are produced by a flip-flop FF

(94) whose Q state corresponds to $D_{ON}$ while $\overline{Q}$ corresponds to Doff. The FF (94) is set and reset by two comparators. Comparator Comp1 produces a reset signal whenever the capacitor voltage ($V_{C_C}$) drops below a reference voltage ($V_{ref1}$). The FF (94) is set when the input current drops to zero. An independent oscillator OSC (95) is utilized to initiate and/or trigger the circuit at start-up or in a case of deadlock (i.e., resuming normal operation). The OSC is inactive during normal operation, since its frequency is constant and lower than the frequency of the signal at the output of the flip-flop (94), of which signal resets the OSC (95). Under normal operating conditions, the capacitor $C_C$ is charged from level $V_{ref1}$ by a current ($I_1-k*i_{ina}$) and discharged by $k*i_{ina}$ to return to $V_{ref1}$.

Figure 10:
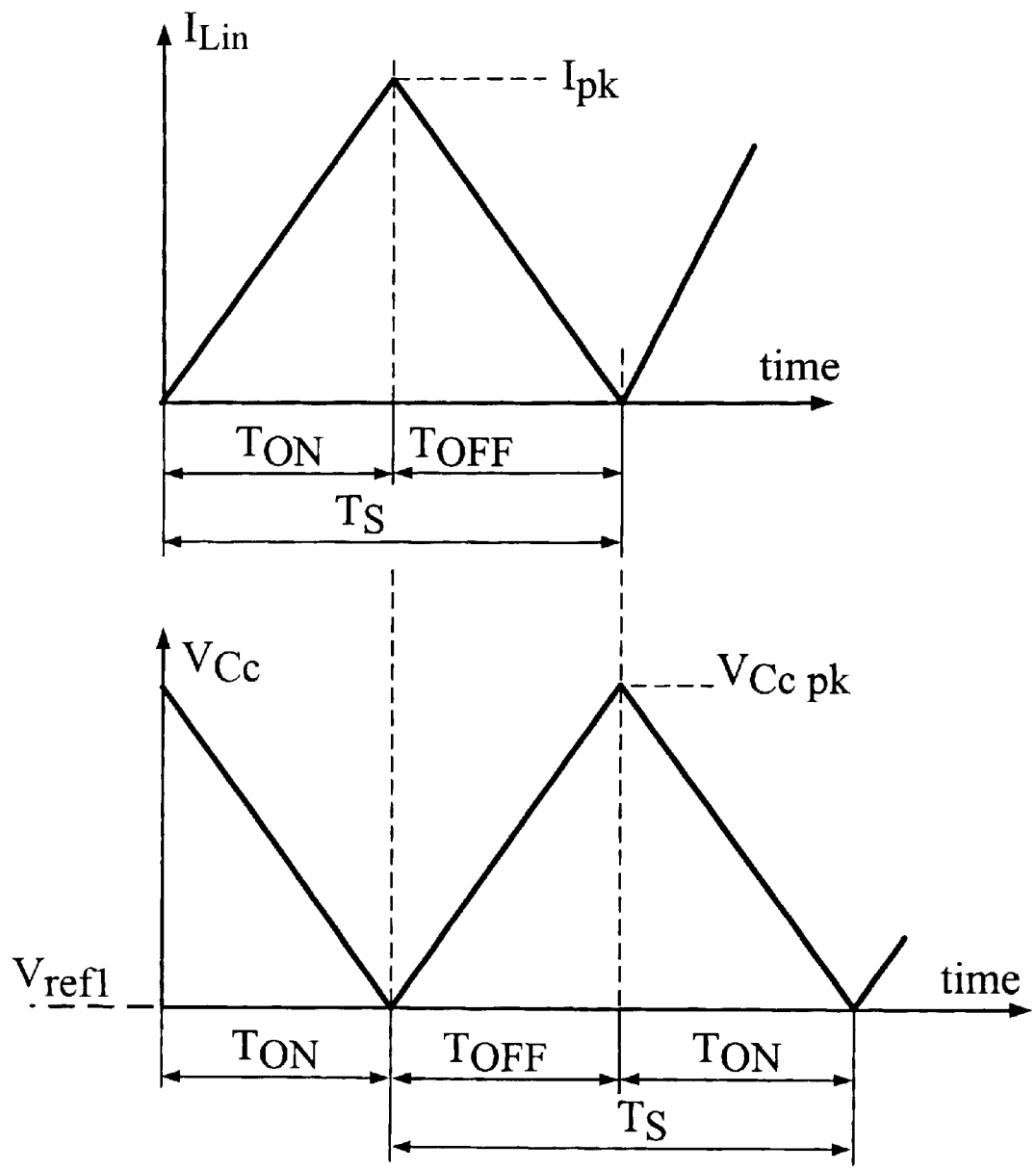
FIG. 10 illustrates exemplary control waveforms for the exemplary controller illustrated in FIG. 9.

The relationship between the voltage across $C_C$ ($V_{C_C}$) and the inductor (current ($i_{ina}$) is depicted in FIG. 10. Duration $T_{ON}$ is triggered whenever the inductor current drops to zero, while duration $T_{OFF}$ is triggered whenever the voltage of $C_C$ drops to the level of Vref1. The peak voltage of $C_C$ ($V_{pk}$) (,an be calculated from duration $T_{OFF}$ and duration $T_{ON}$:

$$V_{Cpk} = \frac{(I_1 - ki_{ina})T_{OFF}}{C_C} \quad (12)$$

$$V_{Cpk} = \frac{(ki_{ina})T_{ON}}{C_C} \quad (13)$$

from which:

$$(T_{OFF}+T_{ON})k \cdot i_{ina}=T_{OFF}(I_1) \quad (14)$$

since:

$$T_{OFF}+T_{ON}=T_S \quad (14a)$$

one finds that:

$$D_{OFF} = \left(\frac{k}{I_1}\right)i_{ina} \quad (15)$$

Comparing Eq. (15) to Eq. (7), it is evident that the converter of FIG. 9 abides by the programming rule determined by Eq. (7), making it an APFC converter. Furthermore, since the power switch is turned on only after the inductor current drops to zero, the operation is in BCM.

In a practical application, the input resistance of the APFC converter (Re) needs to be adjusted so as to comply with the power requirement of the load. Controlling the proportionality constant N of (7) can conveniently do this. From (7), (10) and (14) we find:

$$\frac{k}{I_1} = \frac{R_e}{V_o} \quad (16)$$

Namely:

$$R_e = \frac{k}{I_1}V_o \quad (17)$$

Equation (16) implies that either controlling k or $I_1$ can adjust the input resistance (Re).

Figure 11:
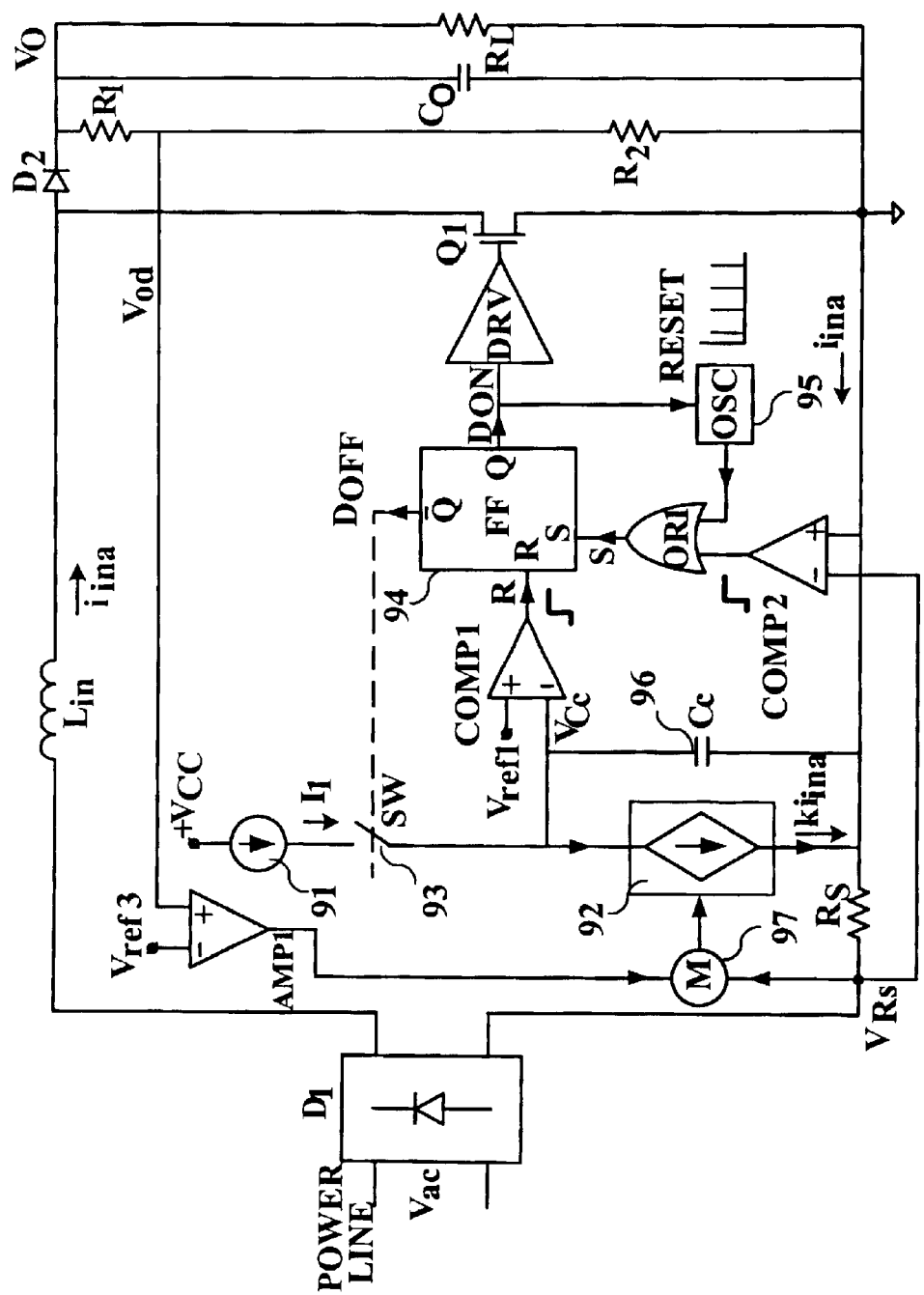
FIG. 11 illustrates the general layout and functioning of one possible embodiment in which 'k' is a variable, according to one embodiment of the invention.

FIG. 11 illustrates a solution for controlling the variable 'k'. This is accomplished by applying an error amplifier AMP1 that produces a signal that is proportional to the deviation of the output voltage (as measured via the divider R1, R2) from a reference voltage $V_{ref3}$. The amplified error signal is fed to one input of an analog multiplier M (97), while VRs, being proportional to $i_{ina}$, is fed to another input of said analog multiplier M, thereby allowing to control the coefficient 'k' of the dependent current source (92), which is varied so as to keep the output voltage ($V_O$) constant. Whenever load $R_1$ changes, the current passing through it changes accordingly. The controller compensates for these current changes by correspondingly changing the frequency of the signal output from the output Q of the flip-flop 94, which controls power switch $Q_1$. Assuming that the voltage $V_{ivR}$ (FIG. 12) appearing at one contact of inductor $L_{in}$ and output voltage $V_O$ are essentially kept the same, i.e. the voltage fed into inductor $L_{in}$ being essentially the power line voltage and the output voltage $V_O$ being a regulated voltage, the voltage on $L_{in}$ is essentially kept constant, resulting in $L_{in}$ current declining from its peak value to a zero value at a rate which is essentially constant, independent of the load value. However, since the inductor's peak (and resulting average) current changes (i.e. due to changes in the load), while the inductor's current declining-rate remains rather constant, $T_{OFF}$ (FIG. 10) changes accordingly, and so does $T_{ON}$ (i.e. due to corresponding changes in $V_{Cpk}$ (FIG. 10). No matter what the changes in $T_{OFF}$ are, $D_{OFF}$ is kept constant for any value of load current. Only the switching frequency is changed in accordance with the load changes. For example, if the load's current is increased, $V_O$ tends to decrease. However, AMP1, together with Multiplier 97 (FIG. 11), yield a signal that causes the magnitude of current source 92 to decrease (i.e. by decreasing the value of parameter k). Therefore, the net charging and discharging current passing through capacitor $C_C$ change so as to change the frequency of the control signal (i.e. the signal at the flip-flop output Q), thereby providing a corresponding higher inductor peak current $I_{pk}$ (FIG. 10) while essentially keeping the declining/rising rate of the inductor current constant.

Additionally or alternatively, the current source $I_1$ can be controlled.

Figure 12:
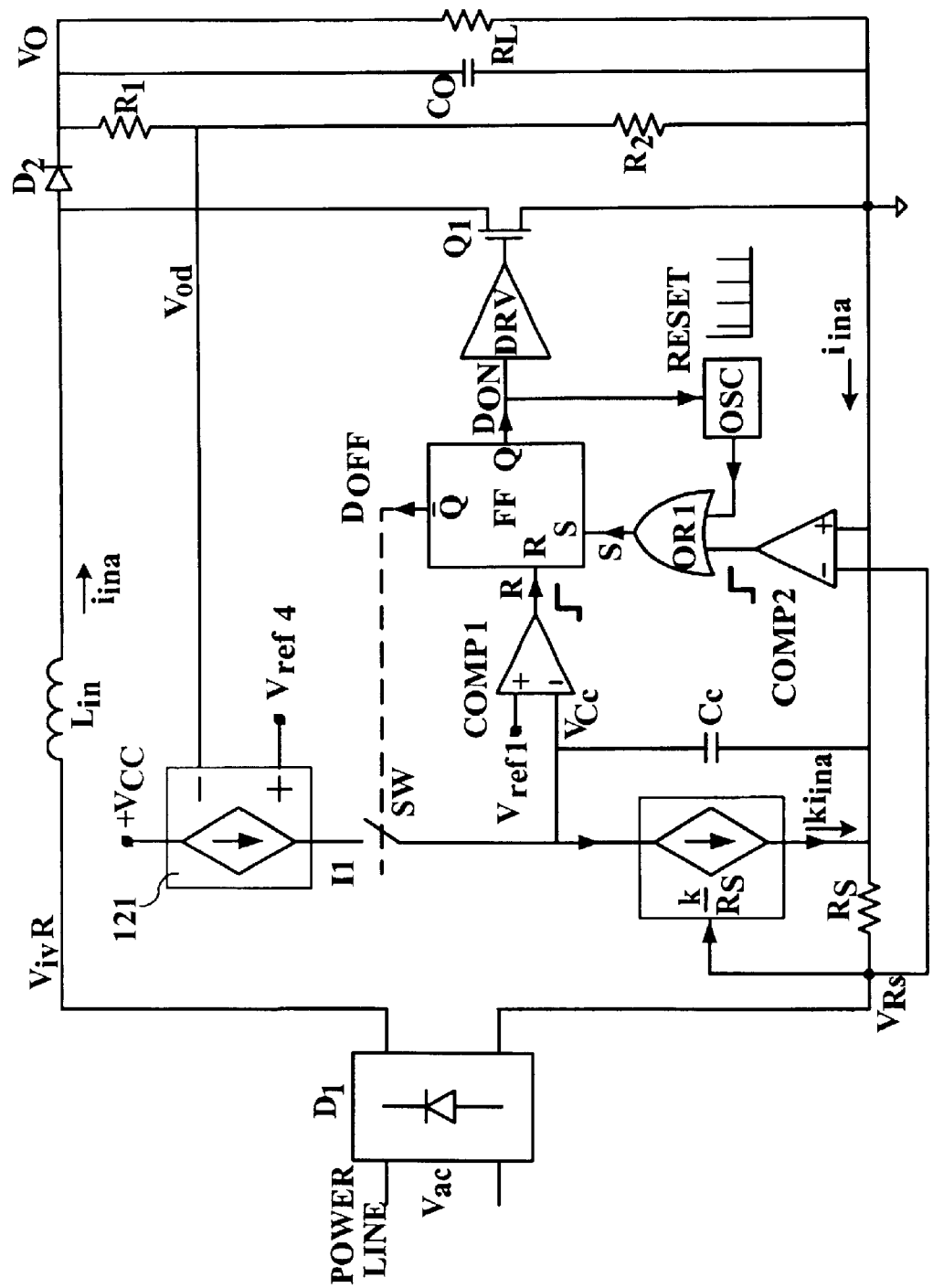
FIG. 12 illustrates the general layout and functioning of another possible embodiment in which the $I_1$ is a variable, according to one embodiment of the invention.

FIG. 12 illustrates a possible solution for controlling Re by controlling $I_1$. Here, the controllable current source that produces $I_1$ is realized by a dependent current source 121 (transconductance amplifier). The magnitude of $I_1$, thus, varies whenever the output voltage deviates from the desired value ($^{Vref4}$), thereby balancing the input and output power. It should be noted that, like the role of 'k' in FIG. 11, $^{I_1}$ changes in accord with changes in $^{R_1}$, (these changes being reflected in $^{Vot}$) so as to change the frequency of the control signal (i.e. the signal at the flip-flop output $^Q$) in the same manner as in the circuitry illustrated in FIG. 11.

Figure 13:
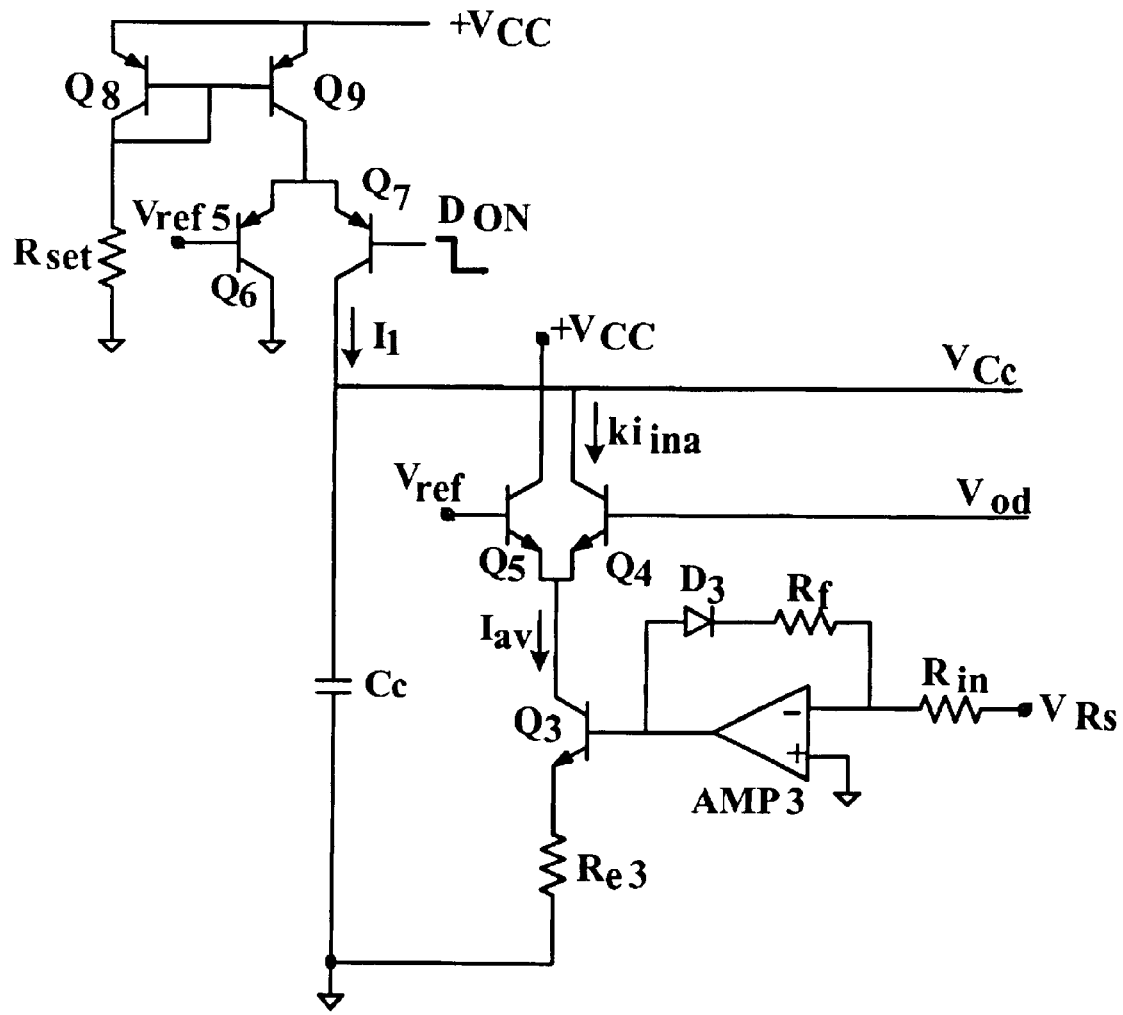
FIG. 13 illustrates exemplary realization of a circuit in which $I_1$ is a variable in accordance with the general layout illustrated in FIG. 12.
Figure 14:
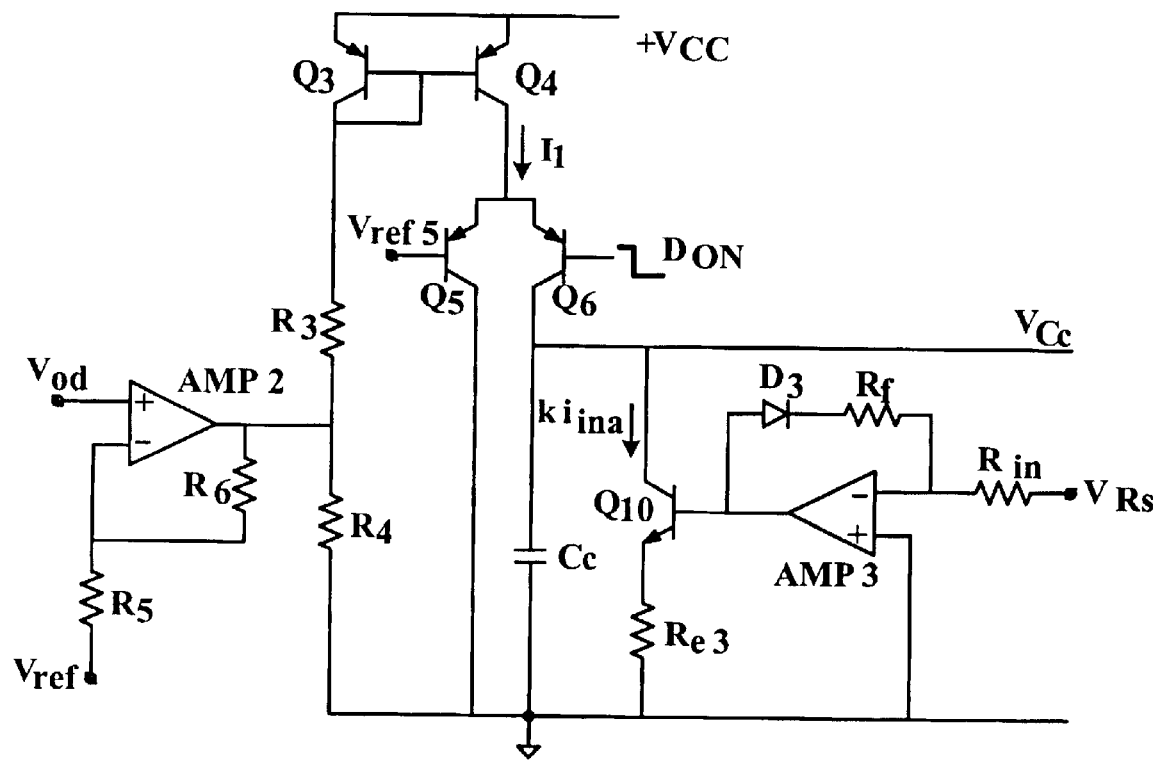
FIG. 14 illustrates exemplary realization of a circuit in which 'k' is a variable in accordance with the general layout illustrated in FIG. 11.

Those skilled in the art will understand that there are many possible ways to implement the electronic circuits of this invention. For example, controlling 'k' can be implemented by a circuit, such as shown in FIG. 13. Multiplying is accomplished by the two-quadrant multiplier, built around $Q_3, Q_4, Q_5$. The current mirror $Q_8, Q_9$ generates the constant current, and the switching function is built around the pair $Q_6, Q_7$. Additionally, the variable '$I_1$' can be controlled, for example, in the way illustrated in FIG. 14. Here, error amplifier AMP2 controls the current mirror that generates $I_1$, while $k*i_{ina}$ is constant by the current source built around AMP3 and $Q_{10}$.

Figure 15:
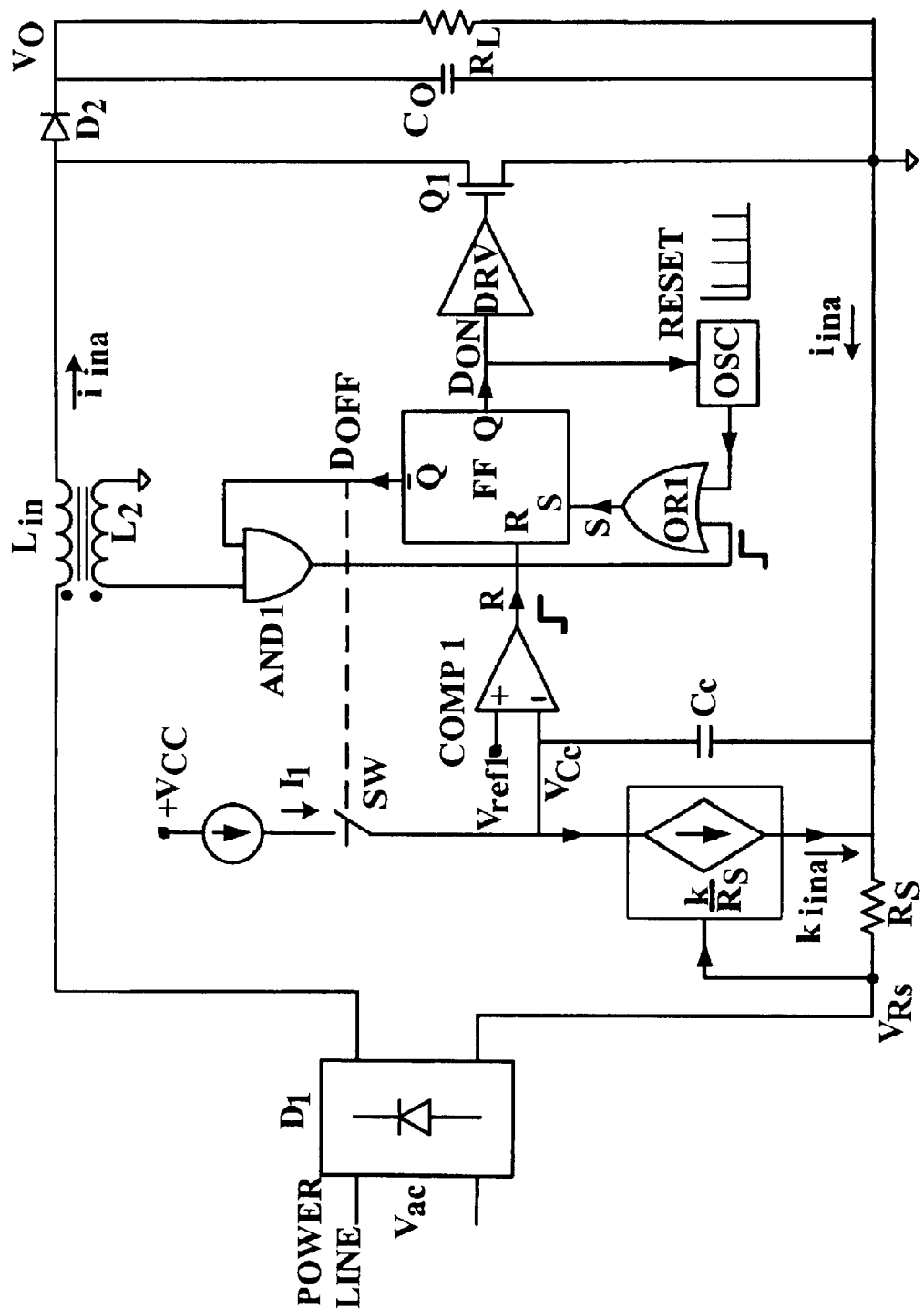
FIG. 15 illustrates a general layout and functioning, showing 'End of $T_{OFF}$' 'pick-up' from inductor voltage, according to another embodiment of the invention.
Figure 16:
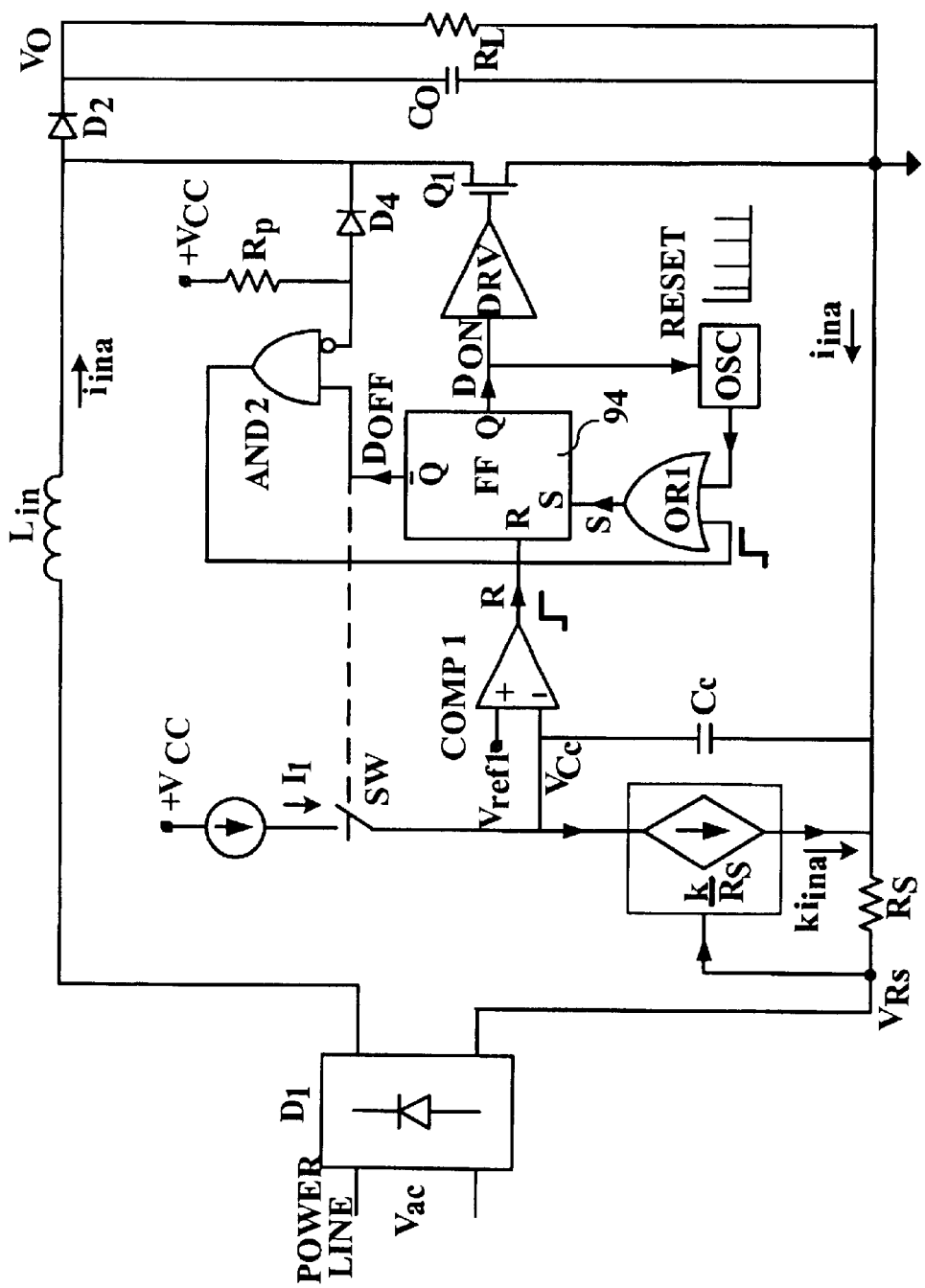
FIG. 16 illustrates a general layout and functioning, showing 'End of $T_{OFF}$' 'pick-up' from power transistor voltage, according to still another embodiment of the invention.

The detection of the instance at which the inductor current ($i_{ina}$) reaches a zero value can also be accomplished in a variety of ways. For example, FIG. 15 depicts the option of detecting the zero level by an extra winding $L_2$ on the main inductor $L_{in}$. An additional method of detection is shown in FIG. 16, in which zero current detection is based on 'dropping' the POWER MOSFET ($Q_1$) voltage caused by the interaction of the negative inductor current and the resonant network composed of $L_{in}$ and the parasitic capacitance at the junction of $Q_1$, $L_{in}$ and $D_2$. The reverse current of the diode $D_2$ induces the negative inductor current that causes a negative voltage at the drain of $Q_1$. When this voltage reaches about zero level, diode $D_4$ conducts, thereby generating the trigger that sets the FF (94); i.e. its output Q is forced to be in 'High' state.

The example described hereinabove relates to operating an APFC converter in BCM mode. According to the invention, essentially the same apparatus can be exploited as a basis for a CCM-based converter—also without sensing/sampling the input voltage.

Figure 17:
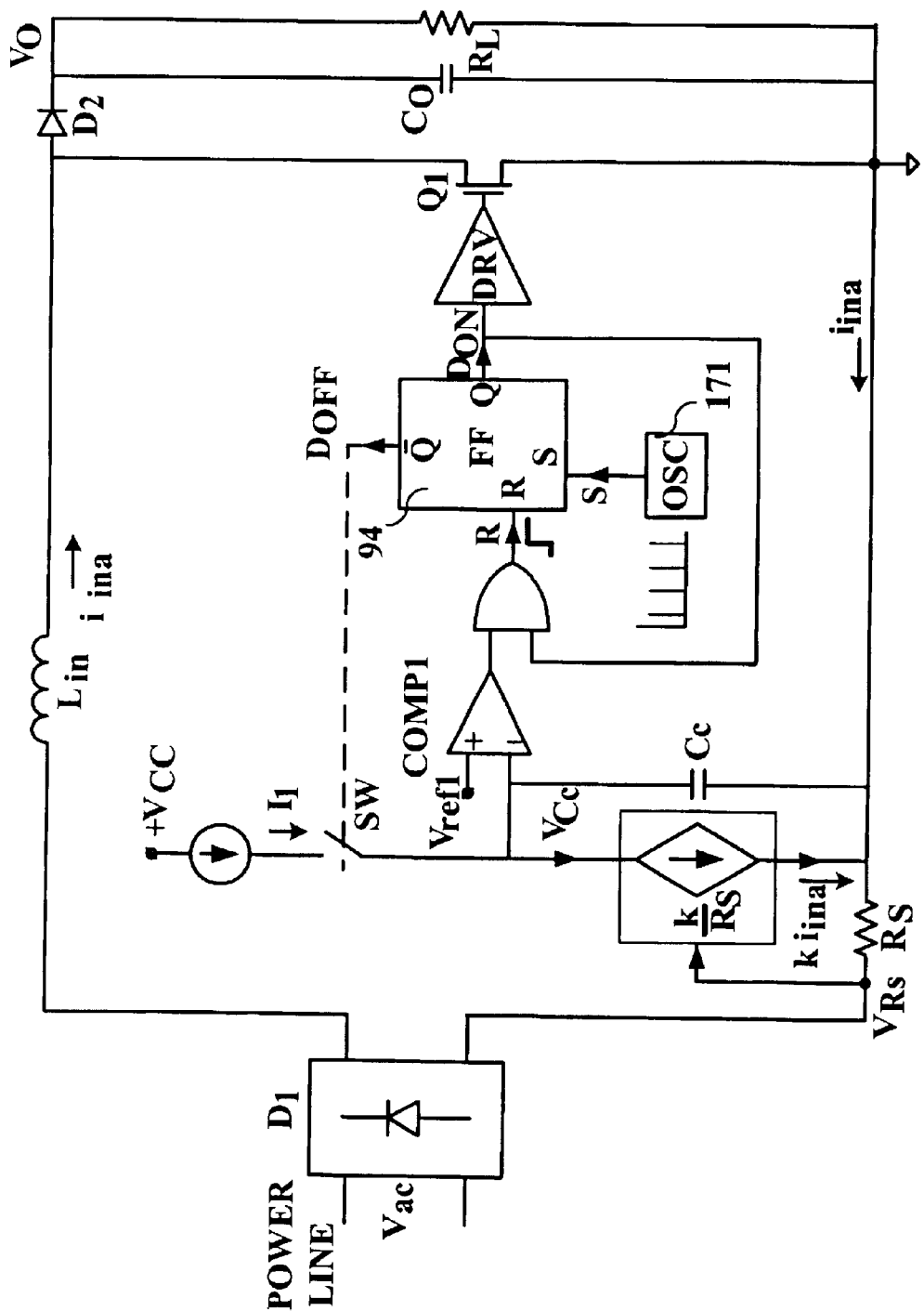
FIG. 17 illustrates a first general layout and functioning according to which the CCM APFC is implemented without sensing the input voltage, according to still another embodiment of the invention.

FIG. 17 illustrates replacing the zero inductor-current detection circuitry by a constant frequency oscillator. Since Eq. (15) still holds, the converter functions as an APFC even if the inductance of $L_{in}$ is large, forcing the converter to operate in CCM mode. In this case, the flip-flop (94) is set to be in its 'High' state (i.e. Q='High') at constant intervals as determined by the Clock of a constant frequency oscillator OSC (171), of which frequency is so predetermined to force the converter to operate in CCM mode.

Figure 18:
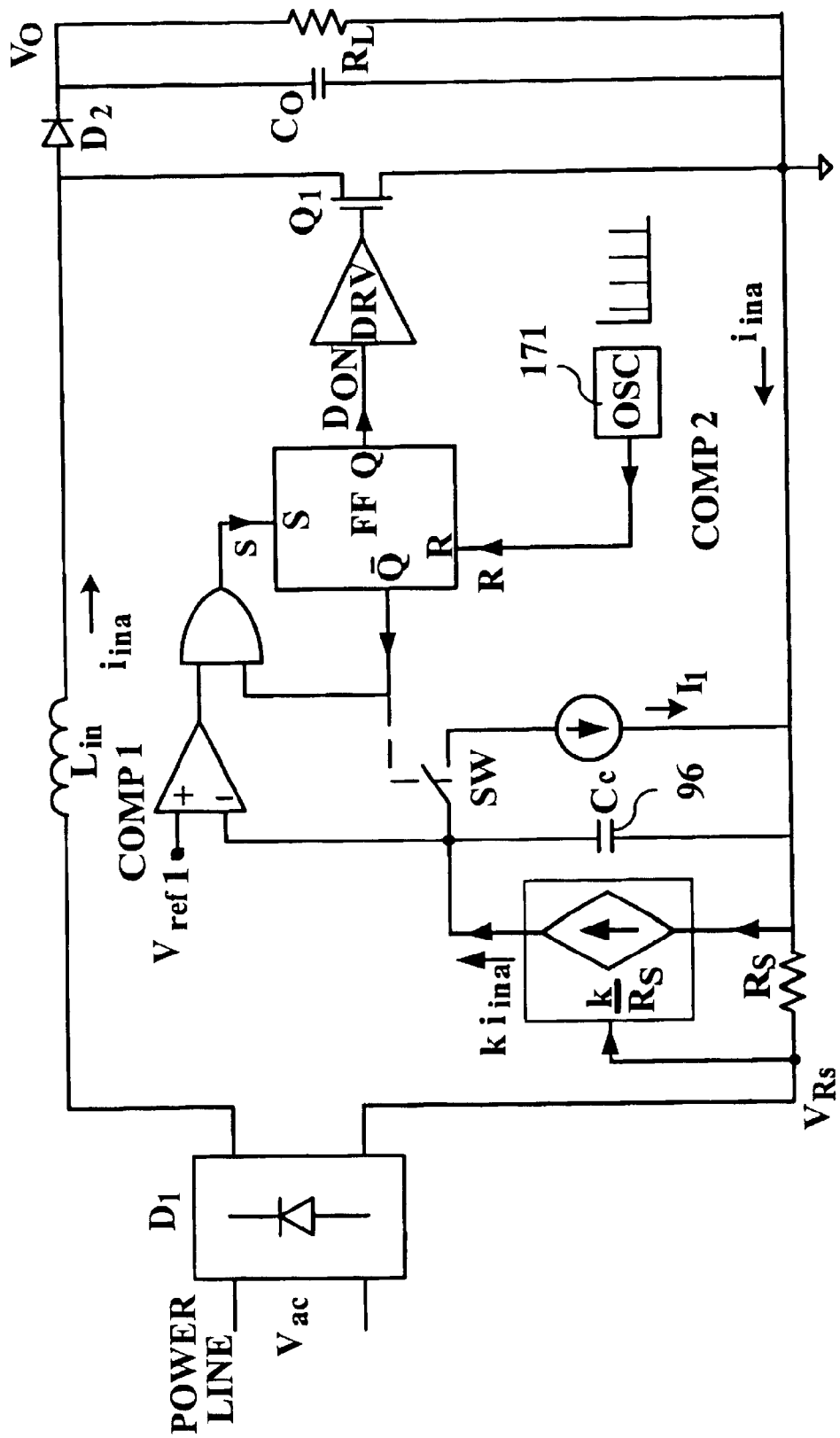
FIG. 18 illustrates a second general layout and functioning according to which the CCM APFC is implemented without sensing the input voltage, according to still another embodiment of the invention.

FIG. 18 illustrates an alternative embodiment to the control scheme for CCM mode of operation. In this case the current $k^*i_{ina}$ charges the capacitor $C_C$ (96) while the current $\{I_1-k^*i_{ina}\}$ discharges it. As will be obvious to those skilled in the art, the operation of this circuit is analogous to the circuit illustrated in FIG. 17, except that in FIG. 18, the charging and discharging currents are reversed. Since Eq. (14) still holds in this case, CCM APFC operation is assured.

It should be noted that in both circuits of FIGS. 17 and 18, the oscillator is operative in normal operation, as it determines the required (constant) frequency of the CCM mode of operation. This is in contradiction to the operation of the oscillator, shown in FIG. 11, wherein it has no function in the BCM mode of operation except for exciting the converter, should the need arise.

According to a preferred embodiment of the invention, essentially the same electronic circuit elements are utilized for either operating the converter in CCM mode or in BCM mode. Switching between these two modes is implemented by a minor hardware change and/or by proper software and/or by configuring the oscillator OSC according to the desired mode of operation.

In practical realization of the CCM scheme, one may need to introduce slope compensation to overcome the possible onset of sub-harmonic oscillations. The slope compensation could be formed by adding, for example, a triangular waveform to the voltage $V_{ref1}$ in FIG. 17.

Digital Implementation

According to a preferred embodiment of the present invention, the implementation of APFC converter requires using a capacitor $C_C$ that is intermittently charged and discharged in each switching cycle. The size of this capacitor is a function of the charging current magnitude and the available dynamic range, i.e., the voltage range that can be handled in a given system. In some cases, the required value of the capacitor may be too large for implementation on an IC, thus becoming a drawback whenever a microelectronics solution is desired. Another practical problem that may deteriorate the performance of an APFC system, is the typical inherent interference of a switch mode system due to spikes. The spikes may cause false triggering of the comparators used in the analog implementation described above.

According to d preferred embodiment of the present invention, the two above-mentioned problems (i.e., too large a capacitance for monolithic implementation and false triggering due to spikes interference) are overcome by performing some modifications in the aforementioned embodiments. As can be appreciated by those skilled in the art, the capacitor, which is intermittently charged and discharged, functions for evaluating the time period (i.e., $T_{ON}$, FIG. 10), after which the Inductor is forced to deliver its stored energy to the load/output. Therefore, the 'timing' function can be performed in a more straightforward method, i.e., by using a counter. According to a preferred embodiment of the present invention, the capacitor is replaced by a programmable counter that can be realized by either hardware or software. In order to solve the second problem (i.e., false triggering), the analog comparators are replaced by digital circuitry.

Figure 19:
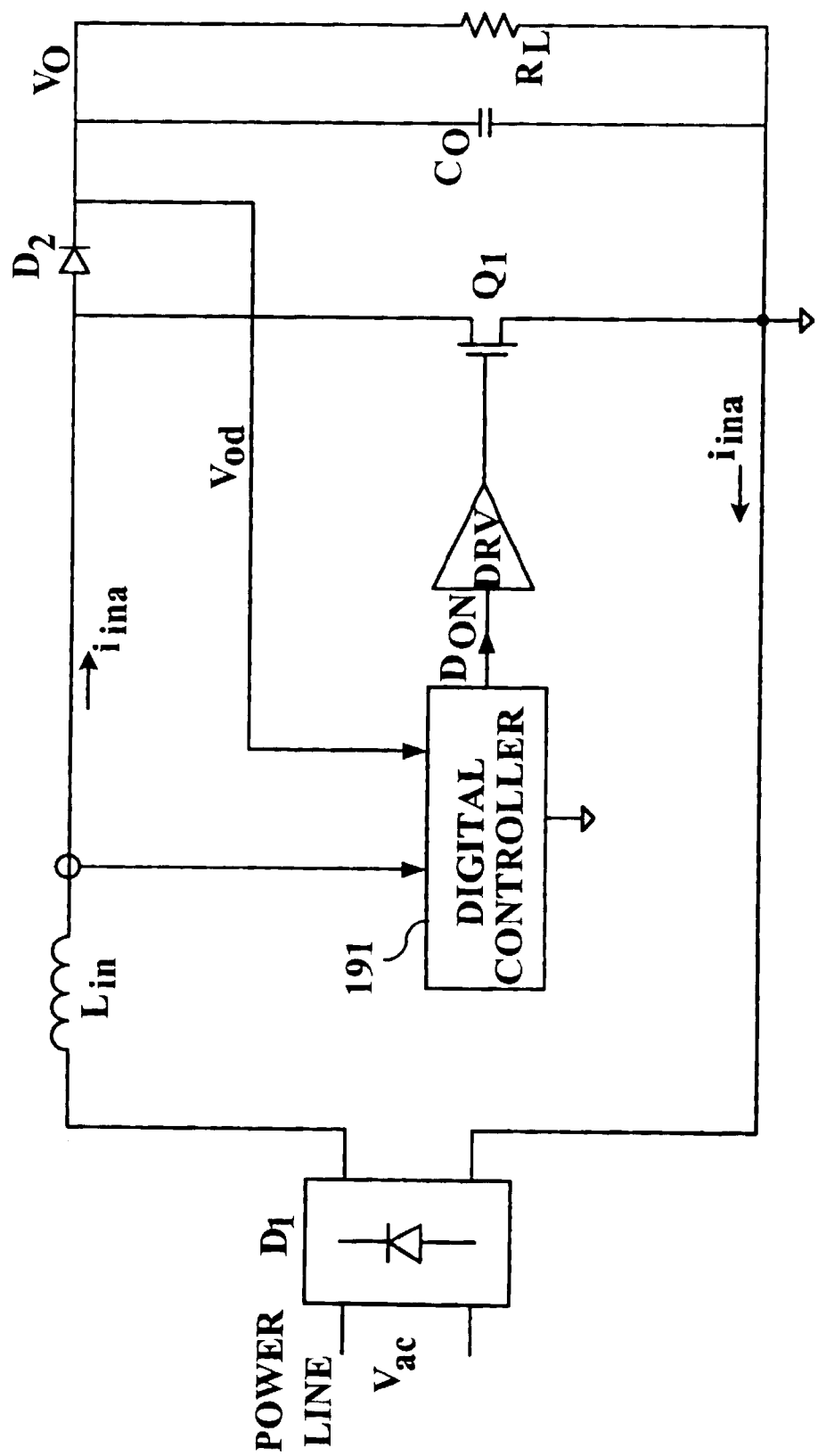
FIG. 19 illustrates a general functioning and layout of a digital APFC controller, according to one embodiment of the invention.

FIG. 19 schematically illustrates layout of a power factor correction circuit that utilizes a digital controller. The Digital Controller (191) receives signals that are proportional to the input current ($i_{ina}$) and output voltage ($V_O$), and generates the required gate signals for the switch $Q_1$. The process utilized by the digital controller emulates the charge and discharge comparison scheme relating to the analog embodiments. Preferably, implementing the Digital Controller is carried out in the ways depicted in FIGS. 20 and 21.

Figure 20:
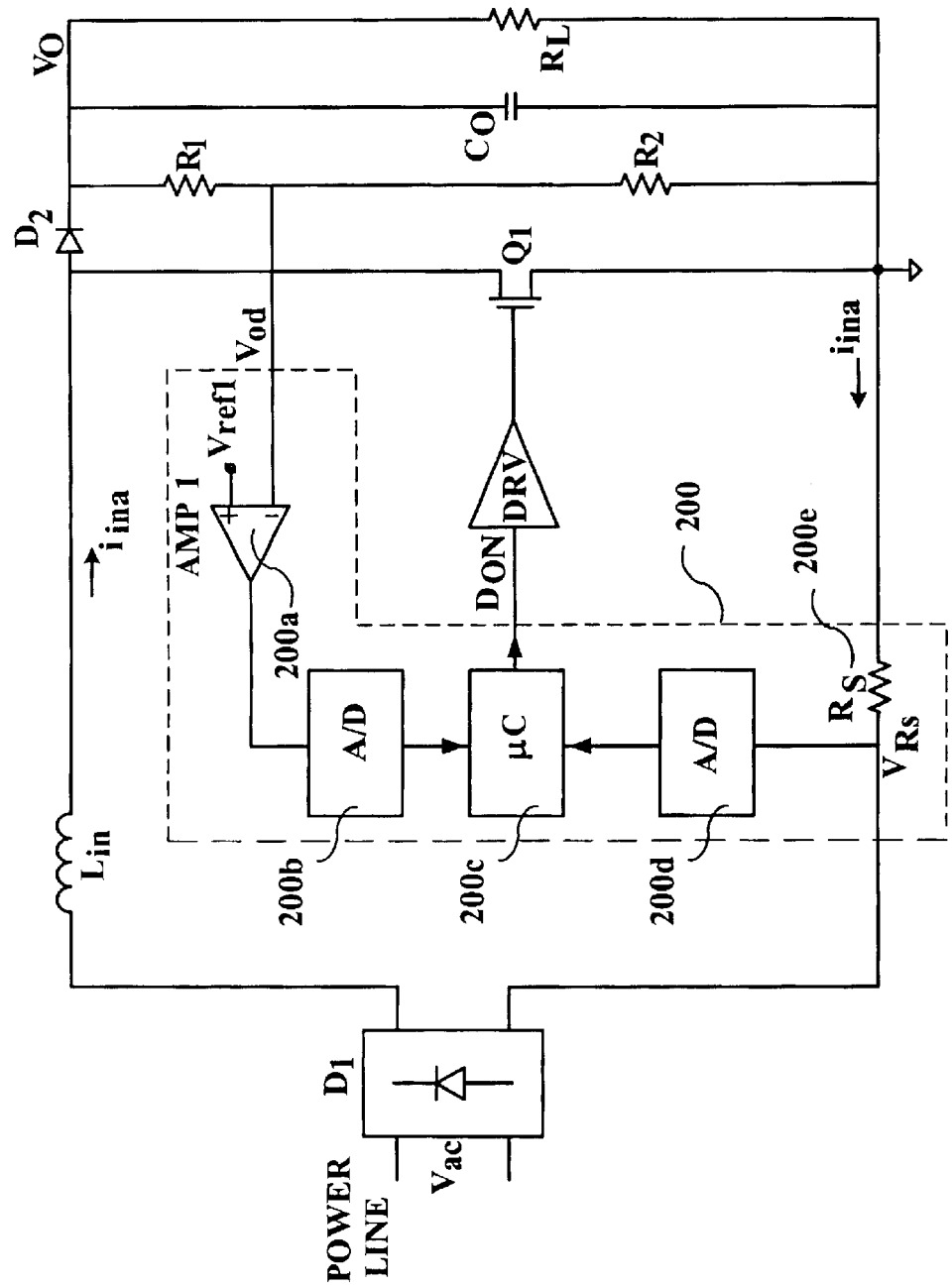
FIG. 20 illustrates a general functioning and layout of a 'microprocessor-based' APFC controller, according to another embodiment of the invention.

FIG. 20 schematically illustrates the implementation of a digital controller.

In this case, digitizing is carried out by an Analog-to-Digital converter (A/D) 200b (for sampling the output voltage V0) and 200d (for sampling the input current $i_{ina}$), and the process is implemented as a program code in the microcontroller (μC) 200c.

According to the invention, an electronic "chip" or module 200 is produced such that it contains some, or all of, the elements 200a to 200e. Digital implementation, such as depicted in FIG. 20 is advantageous, since several critical problems, such as overloading, shortening or disconnecting the output are solved by implementing flexible mathematical manipulations by the microprocessor 200c. An analog implementation would have required additional circuitry to solve these problems. Other mathematical manipulations, such as digital filtering, are also easy to carry out with the microprocessor 200c.

Figure 21:
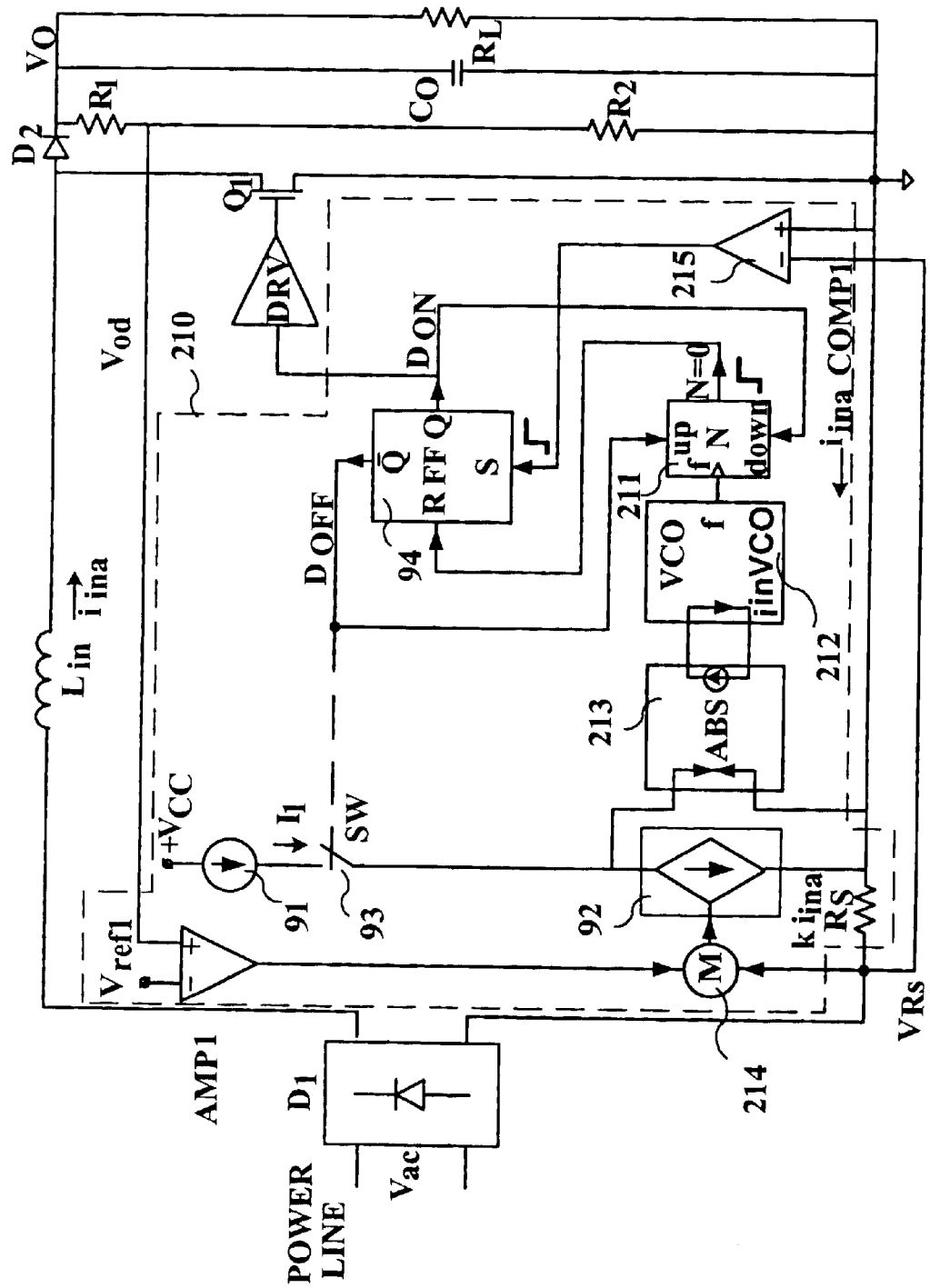
FIG. 21 illustrates a general functioning and layout of a 'counter-based' APFC controller, according to still another embodiment of the invention.

FIG. 21 schematically illustrates another implementation of a digital controller. In this case, the capacitor $C_C$ (for example, in FIG. 11) is replaced by an 'up-down' counter 211 the count rate of which is controlled by a Voltage Controlled Oscillator (VCO) 212, which in turn is connected to the charging and discharging currents after passing the absolute-value stage (ABS) 213. Hence the instantaneous state of counter 211 (i.e., its count value) reflects, at any given time, the total current that flows through 213 and the time that elapses from the beginning of the 'up' or 'down' counting, respectively. The counter's value is, therefore, analogous to the case of the capacitor $C_C$ used in the analog implementation. In other words, the greater the total absolute current sensed by 213, the higher the frequency of the VCO 212 becomes, and consequently, the rate at which the counter value changes. Counting down to N=0 (by counter 211) emulates a capacitor being discharged to a predetermined voltage being equal to a reference voltage, such as the case of $C_C$ in FIG. 11.

The counter counts up, while 'Q' is at 'Low' state and $L_{in}$ delivers energy to the output of the controlled converter (i.e. load). When most, or all, of the inductor $L_{in}$ energy is delivered to the load (this instance is determined whenever the current of $L_{in}$ reaches zero), COMP1 (215) sets the flip-flop (94) output 'Q' to 'High' state, thereby forcing Lin to 'restore' energy and the counter to count down, until N=0. Whenever the value of the counter reaches N=0, the output 'Q' of the flip-flop switches to 'Low' state, thereby opening switch $Q_1$ and forcing said $L_{in}$ to deliver energy stored in it to the output/load. At this stage, the counter counts 'up' to generate a new controlling cycle.

The ABS module depicted in FIG. 21 is required, since the VCO module (212) operates with positive signal at its input. However, distinguishing a positive going current (i.e. $I_1-k*i_{ina}$, FIG. 21) from a negative going current (i.e. $k*i_{ina}$) is carried out by changing the state of the counter, i.e., from 'up' ('+' sign) counting to 'down' ('−' sign) counting, and vice versa. For example, whenever output $\overline{Q}$ of the flip-flop is at 'High' state, switch 93 is closed, thereby causing a total positive current to flow through the ABS module (213), in which case the counter counts up.

According to a preferred embodiment of the present invention, the 'counter-based' controller depicted in FIG. 21 is implemented by discrete modules (such as 91, 92, 94, 211 to 215), or by affiliating these modules functions into one electronic integrated chip (IC) or module (210).

Figure 22:
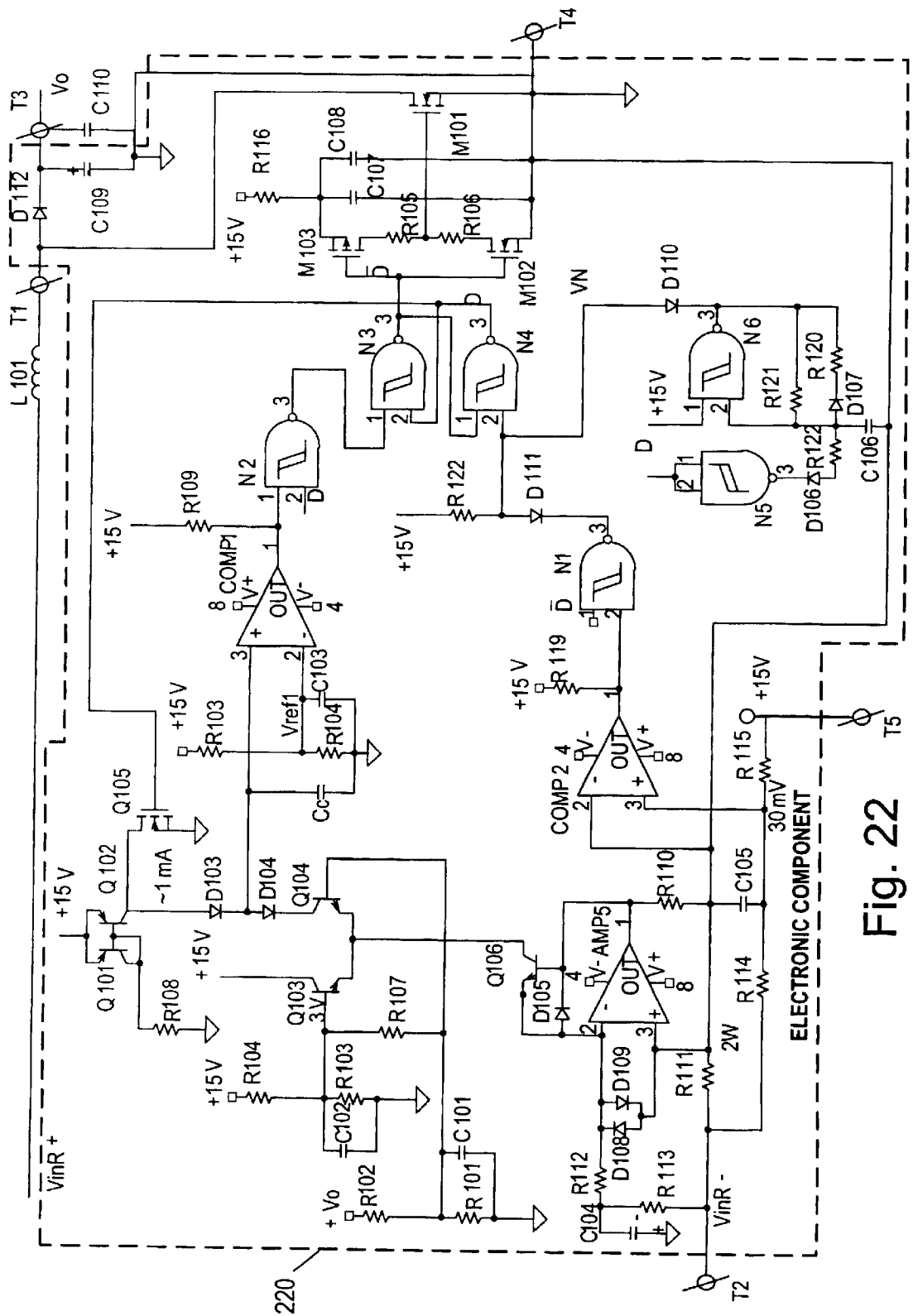
FIG. 22 illustrates a practical example of a 'five-pin' electronic module for implementing APFC circuit in BCM mode, according to a preferred embodiment of the invention.

FIG. 22 illustrates an example for implementing an APFC converter according to a preferred embodiment of the invention. This circuit follows the concept of controlling variable 'k' (see FIG. 11). The input current is sensed by R111, filtered out by R113, C104 and translated to the collector of Q106. The pair Q103, Q104 and Q106 form a two quadrant multiplier such that the current at the collector of Q104 is controlled by the error signal formed by subtracting from a voltage proportional to the out Vo, the reference voltage at the junction of R103, R104. Thus, the collector current of Q104 is controlled by the deviation of $V_O$ from desired level. The current source $I_1$ is implemented by the current mirror pair Q101, Q102. The current $I_1$ forced by Q102 is switched by Q105 such that during $D_{ON}$ $I_1$ is shorted to ground and it does not charge $C_C$. $C_C$ is thus charged and discharged according to the programming rule (12, 13). The triggers for the FF are obtained by comparators COMP1 and COMP2 that detect when $C_C$ discharge reaches $V_{ref1}$ and by COMP2 that detects when the input current drops to zero. The FF is formed by two NAND gated N3, N4 while the oscillator is built around N6. The rest of the circuit: gate drivers M102, M103, etc., follow the standard design practice.

Still with reference to FIG. 22, there is illustrated an option of including the control circuit components in a 'five-pin' module 220, in accordance with the present invention. Such a module is advantageous, since it simplifies and shortens the design phase of APFC systems.

It should be noted that the control function of an APFC system is preferably implemented by a module 220, as depicted in FIG. 22. However, according to the present invention, some components may be left outside this module. For example, input current 'sense' resistor R111 (FIG. 22) and/or main diode D112 and/or main transistor (i.e., power switch) M101 may be left outside module 220. Additionally, the auxiliary power supply for powering module 220 may be external or internal.

Figure 23:
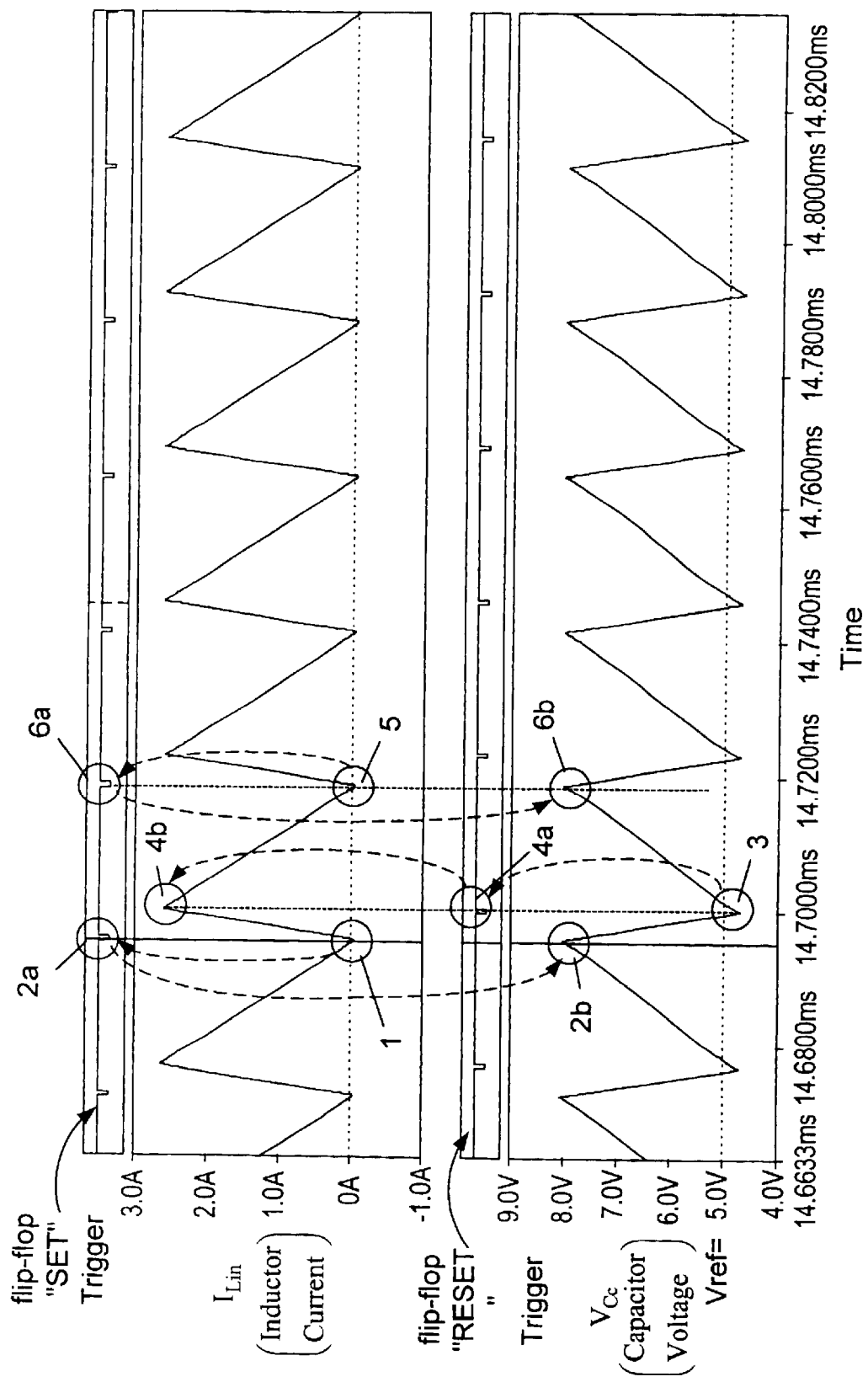
FIG. 23 illustrates a simulated boost inductor (Lin) current and capacitor (Cc) voltage for the exemplary boost converter illustrated in FIG. 9.

FIG. 23 illustrates a simulated boost inductor ($L_{in}$) current and capacitor ($C_C$) voltage for the exemplary boost converter illustrated in FIG. 9. Assuming that a cycle starts at point 1; i.e., the boost inductor current reaches, a zero value, this point (1) generates a 'SET' signal (2a) that forces the flip-flop 94 (FIG. 9) to Q='High', thereby forcing energy to be accumulated in the inductor. Additionally, switch 93 (FIG. 9) is not conducting, thereby causing the capacitor 96 (FIG. 9) to discharge from point 2b to point 3. At point 3, the capacitor voltage reaches the reference voltage (i.e., 5 Volts), thereby generating a 'RESET' signal (4a) that forces the flip-flop 94 (FIG. 9) to Q='Low', thereby forcing the inductor to deliver energy to the output (RL, FIG. 9). Accordingly, the current of the inductor starts to decrease from point 4b until it reaches zero value (i.e., at point 5), and another cycle is generated (i.e., a 'SET' signal is generated at 6a, etc.). It should be noted that the frequency of the control signal illustrated in FIG. 23 is about 50 kHz. However, the control circuitry dynamically changes the control frequency in order to meet the circuit conditions, such as the size of the inductor and the load at the output of the converter.

Consequently, the control frequency may deviate within a large range; e.g., 50–100 kHz.

Figure 24:
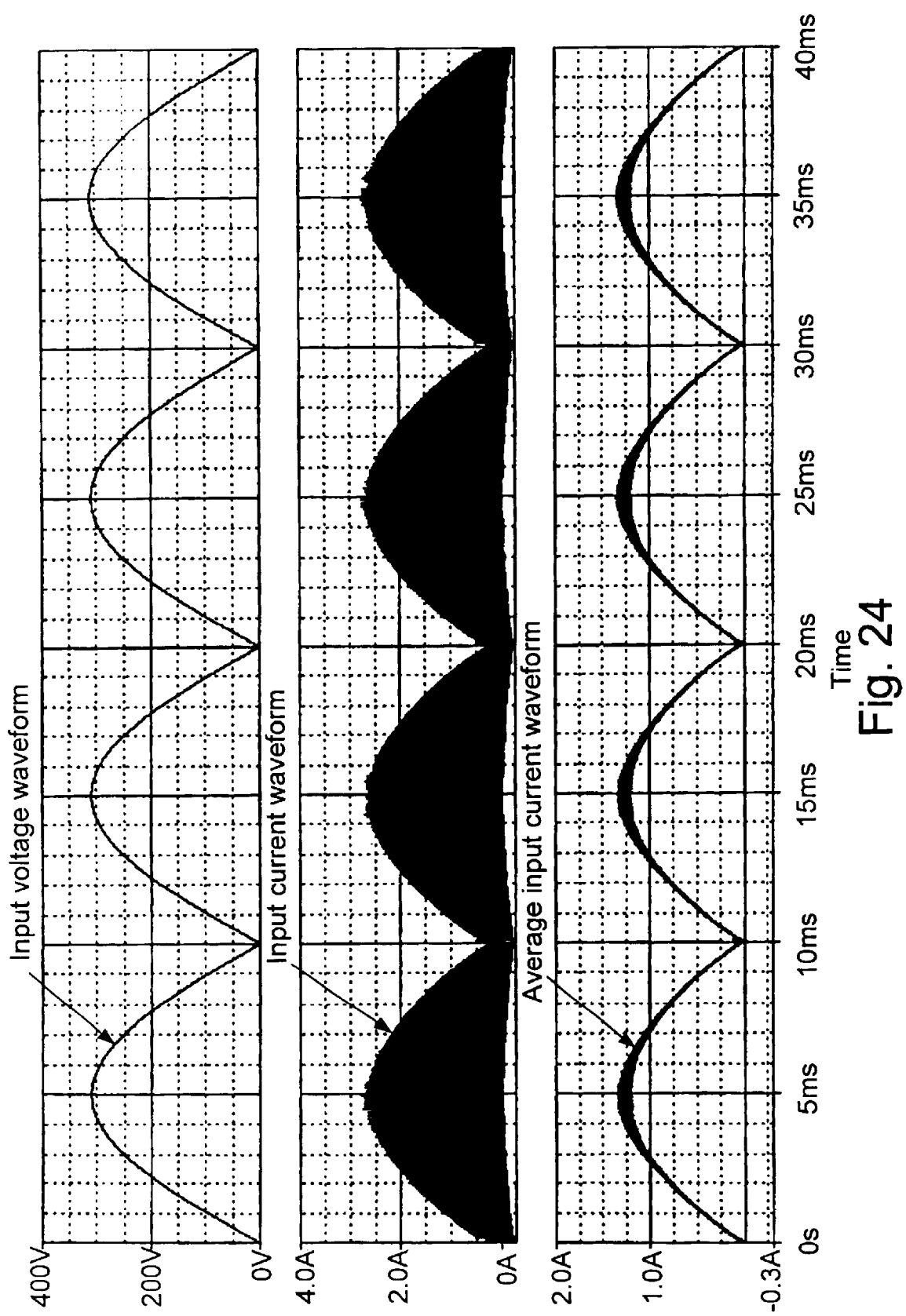
FIG. 24 illustrates a simulated input voltage, input current and average input current for the exemplary boost converter illustrated in FIG. 9, and in accordance with the controlling signal depicted in FIG. 23.

FIG. 24 illustrates a simulated input voltage, input current and average input current for the exemplary boost converter illustrated in FIG. 9, and in accordance with the controlling signal depicted in FIG. 23. As can be seen in FIG. 24, the average input current follows the input voltage in time and amplitude proportionality; i.e., the input voltage and current are maintained in phase relative to each other, thereby providing unity power factor. As is mentioned in this disclosure, the essence of the present invention is implementing a BCM without sensing the converter's input voltage, which is advantageous, since it allows generating a 'cleaner' control signal (i.e., with far fewer spikes and distortions), which reflects in an average input current that is nearly free of interference and distortions, as can be seen in FIG. 24.

Figure 25:
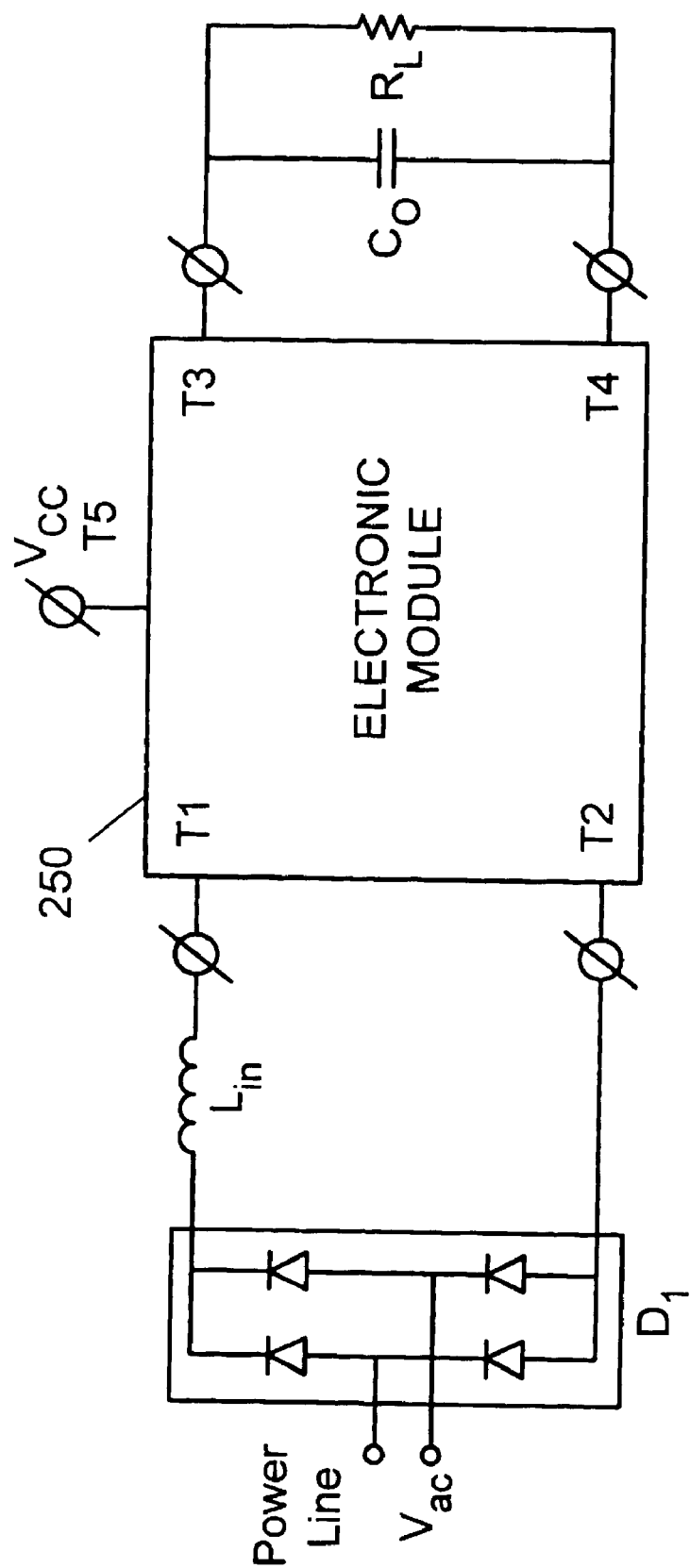
FIG. 25 illustrates a 'five-pin' modular implementation of an APFC system, the module of which detailed circuitry is depicted in FIG. 22, according to one embodiment of the invention.

FIG. 25 illustrates, in accordance with the present invention, a typical modular APFC system, wherein the control circuitry is contained in a 'five-pin' module 250, such as that depicted in FIG. 22 (220). In addition to the above-mentioned advantages of a modular implementation, a modular implementation, such as that depicted in FIG. 25, reduces the size and price of the APFC systems.

Figure 26:
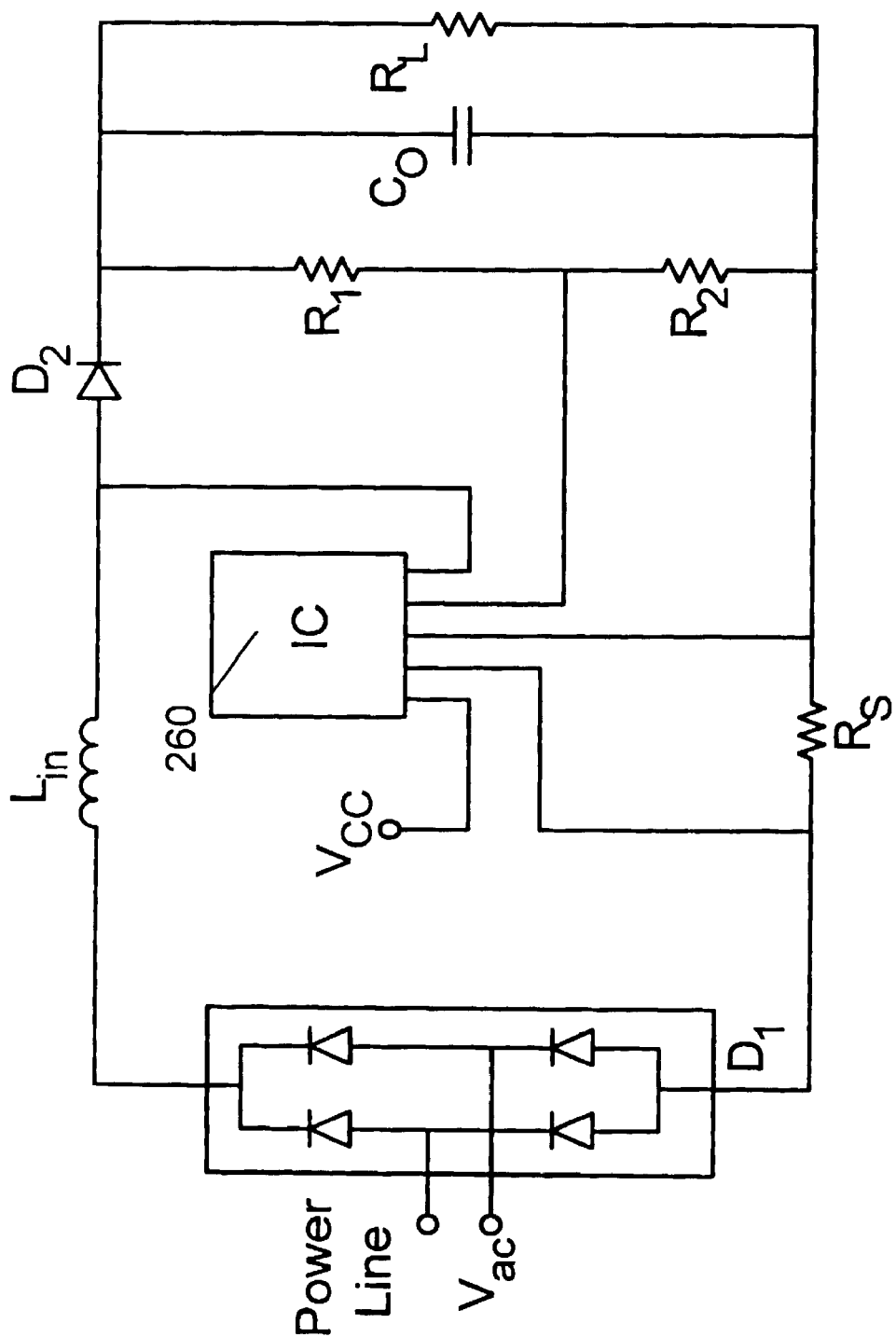
FIG. 26 illustrates microelectronics unit implementation, according to another embodiment of the invention.

FIG. 26 illustrates implementing an APFC controller by microelectronics. According to the present invention, an integrated circuit (IC) 260 performs the control function of the APFC system. The IC implementation is also advantageous in reducing the size and price of APFC systems.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A power factor correction apparatus, for a switching power supply fed by an array of rectifying diodes and consisting of at least an input inductor, a contact of which is connected in series with a contact of said array, and of a power switch connected between the other contact of said array and the other contact of said input inductor, comprising:

a) circuitry for identifying, in each cycle determined by the switching frequency of said power supply, whenever the instantaneous value of the current through said inductor reaches a minimal value;

b) circuitry for switching said power switch to its conducting state in response to said minimal current through said inductor;

c) circuitry for reflecting the current flowing through said inductor by a measurable or simulated parameter; and d) circuitry for providing indication, in each cycle, by using said parameter, said indication being related to the timing until the peak value of said current, that corresponds to a specific load, has been essentially reached, or to the time from the moment that said current reaches said minimal value until said timing, and for switching said power switch to its non-conducting state in response to said indication.

2. Apparatus according to claim 1, further comprising:
a) circuitry for sampling the output voltage;
b) circuitry for generating a signal which reflects the deviation of said output voltage from a predetermined voltage value; and
c) circuitry for modifying the value of one or more of said parameters in response to said signal, and for adjusting the timing at which said power switch is switched to its non-conducting state, thereby allowing the inductor current to reach a different peak value, for compensating said deviation, while keeping the portion, in each cycle, of the time period during which the power switch is in its non-conducting state.

3. Apparatus according to claim 1, in which the minimal value is essentially zero.

4. Apparatus according to claim 2, in which the deviation results from changes in the load.

5. Apparatus according to claim 2, in which the deviation results from changes in the power line voltage.

6. Apparatus according to claim 1, in which the circuitry for reflecting the current flowing through said inductor comprises:
a) a capacitor that is charged/discharged by a combination of a constant current source being inactive during the time periods when the power switch is in its conducting state and a dependent current source for discharging said capacitor with a current that is proportional to the input inductor current, such that the voltage over said capacitor inversely reflects the value of/changes in, the current flowing through said input inductor;
b) a first comparator, connected to said capacitor, for switching the power switch to its non-conducting state and for activating said constant current source whenever the voltage across said capacitor reaches a predetermined reference voltage; and
c) a second comparator that samples the current flowing through said input inductor, for switching the power switch to its conducting state and for disactivating said constant current source whenever the current flowing through said input inductor reaches an essentially zero value.

7. Apparatus according to claim 1, comprising:
a) a timing circuitry for continuously sampling the output voltage of said converter and the input current passing through said converter, and for generating a cyclic intermediate signal, having in each cycle a portion of positive slope and a portion of negative slope, said positive slope having a duration being equal to the time required for said input current to decline from its maximum value, during said cycle, to a zero value, and said negative slope having a duration being equal to the time it takes said intermediate signal to decline from its maximum value to a reference value;
b) a first controllable current source, for adjusting the rising rate of said positive slope portion of said intermediate signal;
c) a second controllable current source, coupled to said timing circuitry, for adjusting the rate of decline of said negative portion of said intermediate signal and the rising rate of said positive slope portion of said intermediate signal, said second controllable current source having a magnitude that is smaller than the magnitude of said first controllable current source;
d) a first controllable switch, coupled to the output of said controlled converter, for controlling the input current of said converter;
e) a second controllable switch for connecting or disconnecting said first current source, for causing said rise and decline portions of said intermediate signal; and
f) a drive circuit, coupled to said timing circuitry, for generating a switching signal from said intermediate signal for switching a first controllable switch for controlling said input current of said converter.

8. A power factor controller according to claim 7, in which said timing circuitry comprises:
a) a first means for comparing a voltage being a representative of the output voltage of said converter with a voltage reference;
b) a second means for sensing whenever said input current reaches a zero value; and
c) means for multiplying the output of said first means by a voltage being a representative of said input current, for adjusting said second controllable current source.

9. A power factor controller according to claim 7, in which said driving circuit comprises a flip-flop, coupled to said timing circuit, that generates switching signal from the intermediate signal, for switching the first controllable switch.

10. A power factor controller according to claim 7, in which said first controllable current source is controlled by a voltage being a representative of the output voltage of the converter that is controlled.

11. A power factor controller according to claim 7, in which said second controllable current source is controlled by a voltage being a representative of the output voltage of the converter being controlled.

12. A power factor controller according to claim 7, in which said timing circuitry comprises a capacitor, coupled to the second switch, to said second controllable current source and to one input of an amplifier, said capacitor being charged whenever said second switch is closed and discharged whenever said second switch is open, the voltage of said capacitor being the intermediate signal and compared to a reference voltage coupled to a second input of said amplifier of which output is coupled to the flip-flop.

13. A power factor controller according to claim 7, in which said timing circuitry comprises:
a) an 'Absolute-value' module (ABS), the input of which is coupled to the first and second current sources whenever the second switch is closed, and to said second current source whenever said second switch is open;
b) a Voltage-Controlled-Oscillator (VCO) module, coupled to the output of the ABS module, having an output clock signal of which frequency being dependent on the value of the magnitude of the current being delivered from the output of said ABS module to the input of said VCO module; and
c) an 'up-down' counter, coupled to the VCO module and to the flip-flop, said counter counts 'up' whenever said second switch is closed and 'down' whenever said second switch is open, said 'up' and 'down' counting rates are a function of said VCO frequency being a representative of the absolute value of the magnitude of the current passing through the input of the ABS module.

14. A power factor controller according to claim 7, in which the timing circuitry further comprises a first oscillator having a constant frequency, for allowing to initialize/excite the operation of the converter and/or to resume normal operation, said first oscillator being inoperative in normal operation of said converter.

15. A power factor controller according to claim 7, in which the timing circuitry further comprises a second oscillator having a constant frequency, for allowing to operate the converter at constant frequency, said frequency being adjusted so as to maintain the input current of the converter above zero.

16. A power factor controller according to claim 14, in which the first oscillator and the second oscillator are the same oscillator, further comprising means for programming and/or for configuring and/or for switching said oscillator.

17. A power factor controller according to claim 7, in which the first current source adjusts a rate of decline of the intermediate signal and the second current source adjusts a rate of rise of the intermediate signal, said second controllable current source being greater in magnitude in comparison with said first controllable current source.

18. A power factor controller according to claim 7, in which the zero value input current of the converter is sensed by means of an analog comparator.

19. A power factor controller according to claim 7, in which the zero value input current of the converter is sensed by digital means.

20. A power factor controller according to claim 7, in which the zero value input current of the converter is sensed by a second inductor, being inductively coupled to the first inductor, said first inductor induces voltage on said second inductor.

21. A power factor controller according to claim 8, in which the control circuit comprises:
   a) a first means for digitizing the output voltage of the converter;
   b) a second means for digitizing the input current of the converter; and
   c) means for processing the data gathered from said first and second digitizing means, for generating the switching signal for the first controllable switch.

22. A power factor controller according to claim 13, in which the control circuit components are contained in a module that comprises five external contacts.

23. A power factor controller according to claim 13, in which the control circuit components are contained in an integrated circuit (IC).

24. A power factor controller according to claim 22, in which the input current sensing resistor and/or the output diode and/or the power switch are contained in, or being external to, a module that comprises five external contacts and/or to an integrated circuit (IC).

25. A power factor controller according to claim 15, in which the first oscillator and the second oscillator are the same oscillator, further comprising means for programming and/or for configuring and/or for switching said oscillator.

26. A power factor controller according to claim 21, in which the control circuit components are contained in a module that comprises five external contacts.

27. A power factor controller according to claim 26, in which the input current sensing resistor and/or the output diode and/or the power switch are contained in, or being external to, a module that comprises five external contacts and/or to an integrated circuit (IC).

28. A power factor controller according to claim 21, in which the control circuit components are contained in an integrated circuit (IC).

29. A power factor controller according to claim 28, in which the input current sensing resistor and/or the output diode and/or the power switch are contained in, or being external to, a module that comprises five external contacts and/or to an integrated circuit (IC).

30. A power factor controller according to claim 23, in which the input current sensing resistor and/or the output diode and/or the power switch are contained in, or being external to, a module that comprises five external contacts and/or to an integrated circuit (IC).

* * * * *